United States Patent
Teller et al.

(10) Patent No.: US 11,362,901 B1
(45) Date of Patent: Jun. 14, 2022

(54) DYNAMIC BALLOON NETWORK COVERAGE MAP

(71) Applicant: SoftBank Corp., Minato-Ku (JP)

(72) Inventors: Eric Teller, Palo Alto, CA (US); Richard Wayne DeVaul, Menlo Park, CA (US); Michael Cassidy, Menlo Park, CA (US)

(73) Assignee: SoftBank Corp., Tokyo (JP)

( * ) Notice: Subject to any disclaimer, the term of this patent is extended or adjusted under 35 U.S.C. 154(b) by 346 days.

(21) Appl. No.: 16/819,491

(22) Filed: Mar. 16, 2020

Related U.S. Application Data

(63) Continuation of application No. 15/787,181, filed on Oct. 18, 2017, now Pat. No. 10,629,097, which is a
(Continued)

(51) Int. Cl.
| | |
|---|---|
| *G06F 15/173* | (2006.01) |
| *H04L 41/0896* | (2022.01) |
| *H04W 84/00* | (2009.01) |
| *G09B 29/00* | (2006.01) |
| *H04L 43/08* | (2022.01) |
| *H04L 43/045* | (2022.01) |
| *H04B 7/185* | (2006.01) |
| *H04L 41/22* | (2022.01) |
| *H04L 9/40* | (2022.01) |
| *H04W 84/06* | (2009.01) |
| *H04W 16/24* | (2009.01) |
| *H04L 41/12* | (2022.01) |

(52) U.S. Cl.
CPC ........ *H04L 41/0896* (2013.01); *G09B 29/006* (2013.01); *H04B 7/18502* (2013.01); *H04L 41/22* (2013.01); *H04L 43/045* (2013.01); *H04L 43/08* (2013.01); *H04L 63/10* (2013.01); *H04W 84/005* (2013.01); *H04W 84/06* (2013.01); *H04L 41/12* (2013.01); *H04W 16/24* (2013.01)

(58) Field of Classification Search
None
See application file for complete search history.

(56) References Cited

U.S. PATENT DOCUMENTS

| | | | |
|---|---|---|---|
| 7,113,497 B2 | 9/2006 | Cromer et al. | |
| 7,116,990 B2 | 10/2006 | Maanoja | |

(Continued)

*Primary Examiner* — Anh Nguyen
(74) *Attorney, Agent, or Firm* — Botos Churchill IP Law

(57) ABSTRACT

Example embodiments may relate to web interfaces for a balloon-network. For example, a computing device may display a graphical interface that provides information related to a balloon network configured to provide service in a geographic area, where the graphical interface includes a map. The computing device may receive real-time bandwidth data related to balloons in the balloon network, where the balloons are each configured to change position via altitudinal movement and via horizontal movement with respect to the ground. Based at least in part on the received real-time bandwidth data, the computing device may display, on the map, a visual representation of bandwidth information corresponding to one or more regions in the geographic area, where the visual representation of bandwidth information updates from time to time based at least in part on a change in position of one or more balloons in the balloon network.

14 Claims, 15 Drawing Sheets

Related U.S. Application Data continuation of application No. 14/297,510, filed on Jun. 5, 2014, now Pat. No. 9,830,835.

(60) Provisional application No. 61/831,505, filed on Jun. 5, 2013.

(56) References Cited

U.S. PATENT DOCUMENTS

| | | |
|---|---|---|
| 7,162,507 B2 | 1/2007 | Carter |
| 7,283,848 B1 | 10/2007 | Pfister et al. |
| 7,356,390 B2 * | 4/2008 | Knoblach .............. B64B 1/64 701/4 |
| 7,693,741 B2 | 4/2010 | Tischer et al. |
| 8,086,547 B2 | 12/2011 | Miller |
| 8,224,355 B2 | 7/2012 | Beydler et al. |
| 8,285,855 B2 | 10/2012 | Lyndersay et al. |
| 8,620,339 B2 | 12/2013 | McCormick |
| 8,718,477 B2 | 5/2014 | Devaul et al. |
| 8,971,274 B1 | 3/2015 | Teller et al. |
| 9,096,301 B1 | 8/2015 | Biffle et al. |
| 9,153,854 B1 | 10/2015 | Biffle et al. |
| 9,628,395 B1 | 4/2017 | Teller et al. |
| 9,830,835 B1 | 11/2017 | Teller et al. |
| 2003/0229595 A1 | 12/2003 | Mononen et al. |
| 2004/0236547 A1 | 11/2004 | Rappaport et al. |
| 2008/0144884 A1 | 6/2008 | Habibi |
| 2010/0085895 A1 | 4/2010 | Bajko |
| 2010/0091677 A1 * | 4/2010 | Griff .................. H04L 43/06 370/252 |
| 2013/0119188 A1 | 5/2013 | Ciampa et al. |
| 2013/0173764 A1 | 7/2013 | Kami |
| 2014/0057626 A1 * | 2/2014 | Uelk .................. H04L 43/16 455/423 |
| 2014/0222248 A1 | 8/2014 | Levien et al. |
| 2017/0155443 A1 | 6/2017 | Haziza et al. |
| 2018/0294870 A1 | 10/2018 | Van Wynsberghe |

* cited by examiner

DYNAMIC BALLOON NETWORK COVERAGE MAP

CROSS-REFERENCE TO RELATED APPLICATION

The present application is a continuation of U.S. patent application Ser. No. 15/787,181, filed on Oct. 18, 2017 and entitled "Dynamic Balloon Network Coverage Map", which is a continuation of U.S. patent application Ser. No. 14/297,510, filed on Jun. 5, 2014 and entitled "Dynamic Balloon Network Coverage Map" that issued as U.S. Pat. No. 9,830,835 on Nov. 28, 2017, which claims priority to and benefit of the filing date of U.S. Provisional patent application Ser. No. 61/831,505, filed on Jun. 5, 2013 and entitled "Interfaces for a Balloon Network," the entire disclosures of which are hereby incorporated by reference in its entirety.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Example embodiments may relate to a web interface for a data network formed by high-altitude balloons that are deployed in the stratosphere. Such a data network may be referred to as a balloon network, and may provide coverage and services to client devices (e.g., mobile devices or other computing devices) operating in a geographic area where the coverage is provided. Coverage throughout the geographic area may vary depending on factors such as balloon locations, balloon movement, and the number of client devices operating in the geographic area, among others. In particular, the varying coverage may be defined in terms of various performance measures such as bandwidth (e.g., downlink or uplink speeds) and latency.

The web interface may include maps that display information relevant to varying performance measures throughout the geographic area. For instance, an individual may be located in the geographic area and may wish to see information related to bandwidth provided by the balloon network in various regions of the geographic area. As such, the individual may access the web interface and see a map with varying colors/patterns representing varying levels or ranges of bandwidth in several regions of the geographic area.

In one aspect, a non-transitory computer readable medium is provided. The non-transitory computer readable medium has stored therein instructions executable by a computing device to cause the computing device to perform functions. The functions include displaying a graphical interface that provides information related to a balloon network configured to provide service in a geographic area, where the graphical interface comprises a map. The functions also include receiving real-time bandwidth data related to a plurality of balloons in the balloon network, where the plurality of balloons are each configured to change position with respect to a ground, where a given balloon is configured to change position via altitudinal movement and via horizontal movement with respect to the ground. The functions further include, based at least in part on the received real-time bandwidth data, displaying, on the map, a visual representation of bandwidth information corresponding to one or more regions in the geographic area, where the visual representation of bandwidth information updates from time to time based at least in part on a change in position of one or more balloons from the plurality of balloons in the balloon network.

In another aspect, a method is provided. The method involves displaying, by a computing device, a graphical interface that provides information related to a balloon network configured to provide service in a geographic area, where the graphical interface comprises a map. The method also involves receiving, by the computing device, real-time bandwidth data related to a plurality of balloons in the balloon network, where the plurality of balloons are each configured to change position with respect to a ground, where a given balloon is configured to change position via altitudinal movement and via horizontal movement with respect to the ground. the method further involves, based at least in part on the received real-time bandwidth data, displaying, on the map, a visual representation of bandwidth information corresponding to one or more regions in the geographic area, where the visual representation of bandwidth information updates from time to time based at least in part on a change in position of one or more balloons from the plurality of balloons in the balloon network.

In yet another aspect, a second non-transitory computer readable medium is provided. The second non-transitory computer readable medium has stored therein instructions executable by a computing device to cause the computing device to perform functions. The functions include displaying a graphical interface that provides information related to a balloon network configured to provide service in a geographic area, where the graphical interface comprises a map. The functions also include receiving real-time performance data related to a plurality of balloons in the balloon network, where the plurality of balloons are each configured to change position with respect to a ground, where a given balloon is configured to change position via altitudinal movement and via horizontal movement with respect to the ground, where the performance data comprises one or more of: (i) latency data, (ii) throughput data, (iii) jitter data, and (iv) error rate data. The functions further include based at least in part on the received real-time performance data, displaying, on the map, a visual representation of performance information corresponding to one or more regions in the geographic area, where the visual representation of performance information updates from time to time based at least in part on a change in position of one or more balloons from the plurality of balloons in the balloon network.

These as well as other aspects, advantages, and alternatives will become apparent to those of ordinary skill in the art by reading the following detailed description, with reference where appropriate to the accompanying drawings.

DETAILED DESCRIPTION

Figure 1:
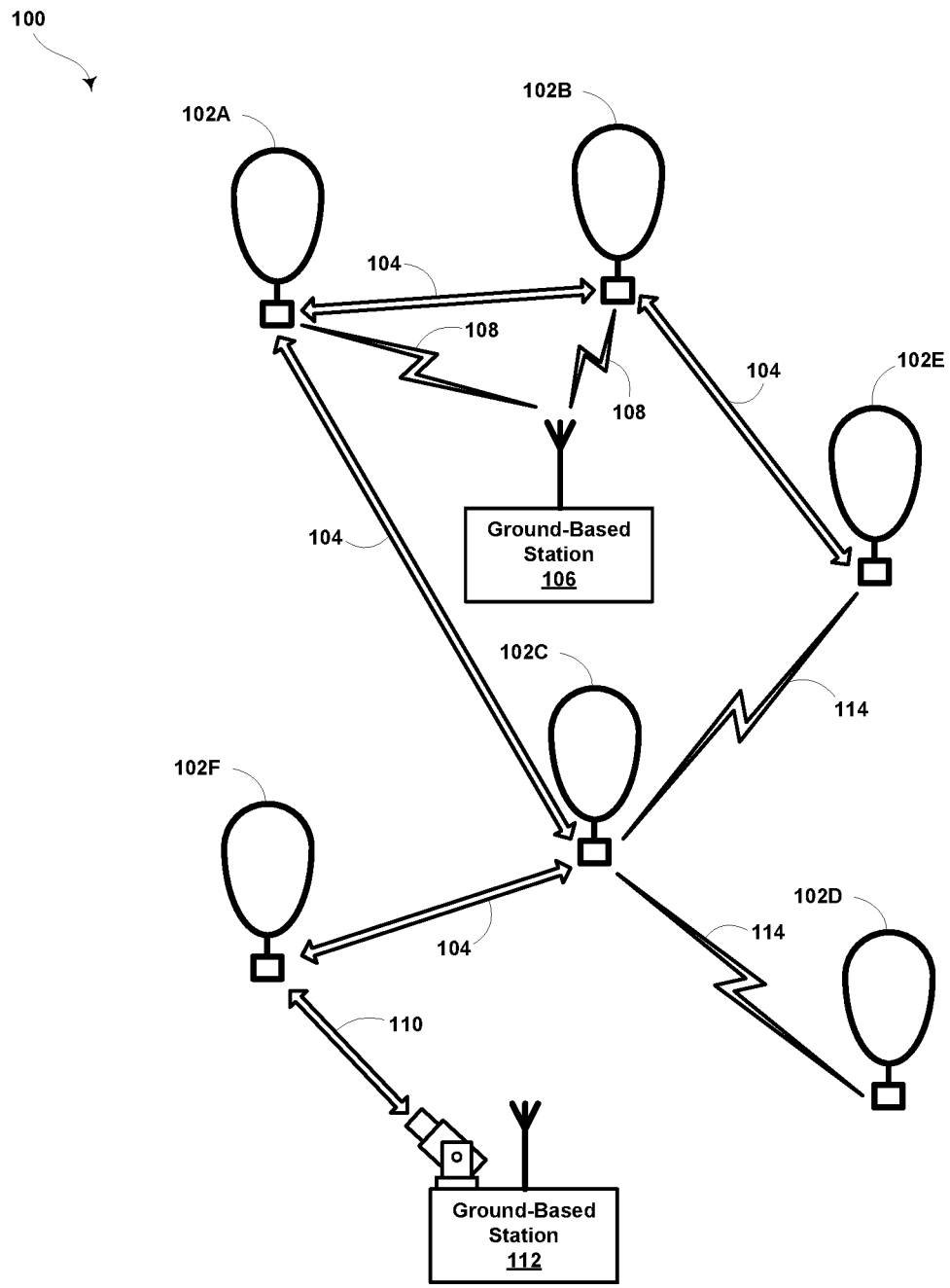
FIG. 1 is a simplified block diagram illustrating a balloon network, according to an exemplary embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Examples of methods and systems are described herein. It should be understood that the words "example" and "exemplary" are used herein to mean "serving as an example, instance, or illustration." Any embodiment or feature described herein as "exemplary" is not necessarily to be construed as preferred or advantageous over other embodiments or features. The example or exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Example embodiments relate to a web interface for a data network formed by aerial vehicles. Such a data network may be formed by balloons, and in particular, may be a mesh network formed by high-altitude balloons deployed in the stratosphere. However, example embodiments are not necessarily limited to balloons and/or balloon networks. It is anticipated that the system and processes that are described in reference to balloons and/or balloon networks may be extended to other types of manned or unmanned aerial vehicles (UAVs) and/or to networks of other types of manned or unmanned aerial vehicles, without departing from the scope of the invention. Examples of such aerial vehicles include, but are not limited to dirigibles and high-altitude platforms (HAPs), among other possibilities.

An example balloon network may provide various types of free and/or paid services to end users, such as wireless data service, voice service, location-based service, and/or weather-data service, among other possibilities. Accordingly, a web interface may be provided that allows users to access information relates to a balloon network's services, to request and/or obtain services from the balloon network, and/or to access various features and functions related to the balloon network.

For instance, an example balloon network may have balloons that move dynamically throughout the coverage area of the network, which may lead to variability in the level of services and/or the availability of services over time. Accordingly, a web interface for the balloon network may provide various features that allow users to learn about the status of the balloon network and its services.

Many other examples are possible. Further, note that a "web interface" for the balloon network may be any interface that allows for network-based interactions, such as a webpage, or a stand-alone desktop or mobile application.

II. EXAMPLE BALLOON NETWORKS

In order that the balloons can provide a reliable data network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

Further, in an exemplary balloon network, the balloons may communicate with one another using free-space optical communications. For instance, the balloons may be configured for optical communications using ultrabright LEDs or possibly lasers for optical signaling (although regulations for laser communications may restrict laser usage). In addition, the balloons may communicate with ground-based station(s) using radio-frequency (RF) communications and/or optical communications.

In some embodiments, a high-altitude-balloon network may be homogenous. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.)

In such a configuration, the super-node balloons may be configured to communicate with nearby super-node balloons via free-space optical links. However, the sub-node balloons may not be configured for free-space optical communication, and may instead be configured for, e.g., RF communications. Accordingly, a super-node may be further configured to communicate with nearby sub-nodes using RF communications. The sub-nodes may accordingly relay communications from the super-nodes to ground-based station(s) using RF communications. Configured as such, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102F, which are configured to communicate with one another via free-space optical links 104. Configured as such, balloons 102A to 102F may collectively function as a mesh network for packet-data communications. Further, balloons 102A to 102B may be configured for RF communications with ground-based stations 106 via RF links 108.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, In order to receive an optical signal from another balloon via an optical link 104, a given balloon 102A to 102F may include one or more optical receivers. Additional details of balloons implementations are discussed in greater detail below, with reference to FIG. 3.

In a further aspect, balloons 102A to 102B may utilize one or more of various different RF air-interface protocols for communication ground-based stations 106 via RF links 108. For instance, some or all of balloons 102A to 102B may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an exemplary network may also include downlink balloons, which provide a high-capacity air-to-ground link.

For example, in balloon network 100, balloon 102F is configured as a downlink balloon. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of or in addition to a free-space optical communication system. The high-bandwidth RF communication system may take the form of an ultra-wideband system, which provides an RF link with substantially the same capacity as the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, a ground-based station 106 may be configured as an access points via which various devices can connect to balloon network 100. Ground-based station 106 may have other configurations and/or serve other purposes without departing from the scope of the invention.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks. Variations on this configuration and other configurations of a ground-based station 106 are also possible.

A. Mesh-Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such case, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be dynamic and adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Further, in some embodiments, balloons may be in continuous or nearly continuous motion, and station-keeping may involve moving balloons so as to try to meet certain requirements for e.g., coverage in various areas.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
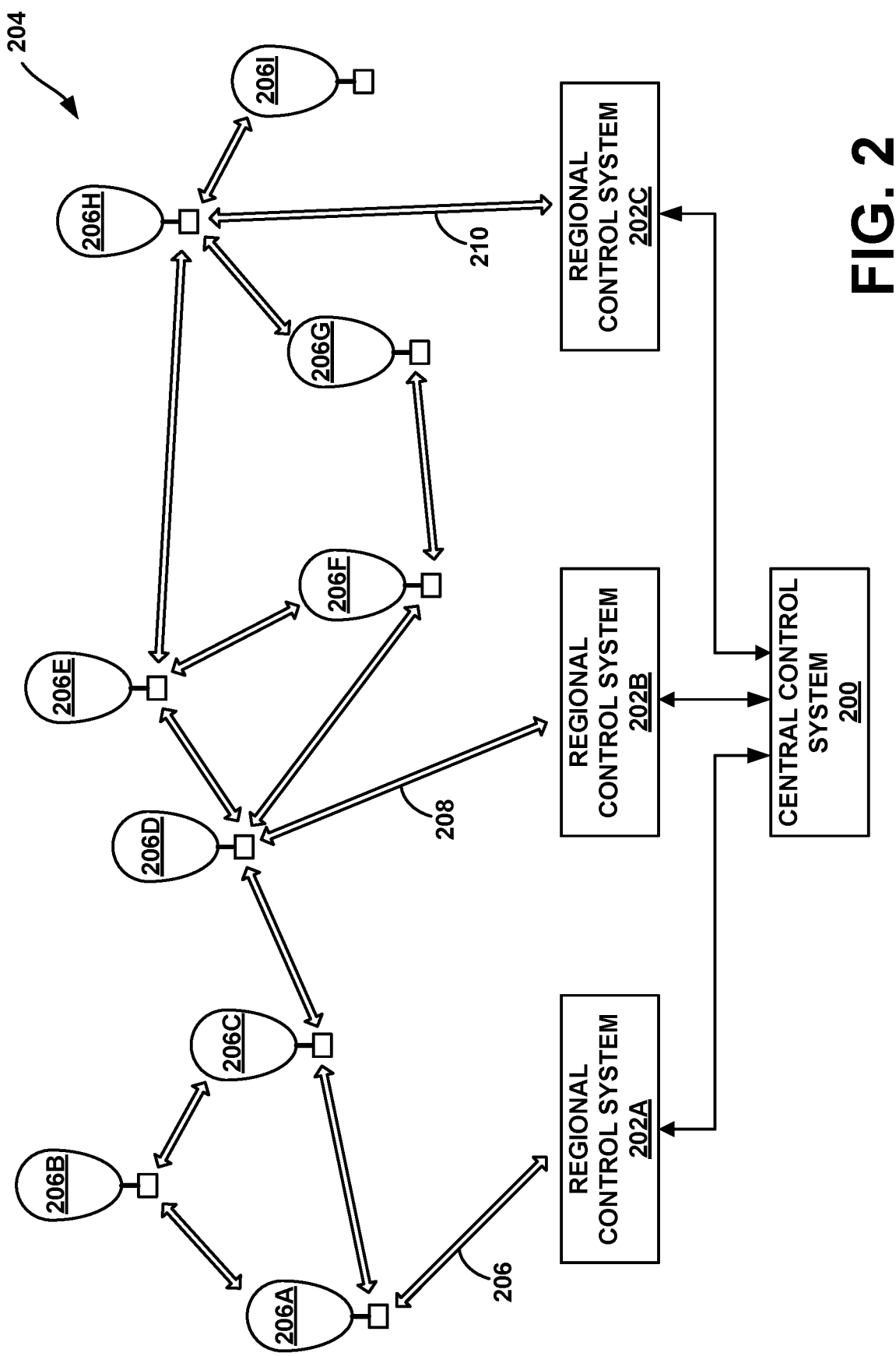
FIG. 2 is a block diagram illustrating a balloon-network control system, according to an exemplary embodiment.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, where only some of balloons 206A to 206I are configured as downlink balloons, the balloons 206A, 206D, and 206H that are configured as downlink balloons may function to relay communications from central control system 200 to other balloons in the balloon network, such as balloons 206B, 206C, 206E to 206G, and 206I. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202B may in fact just be particular type of ground-based station that is configured to communicate with downlink balloons (e.g., such as ground-based station 112 of FIG. 1). Thus, while not shown in FIG. 2, the control system shown in FIG. 2 may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons.

In a further aspect, control and coordination of a balloon network may be shared between a ground-based control system and a balloon network to varying degrees, depending upon the implementation. In fact, in some embodiments, there may be no ground-based control system. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

D. Illustrative Balloon Configurations

Figure 3:
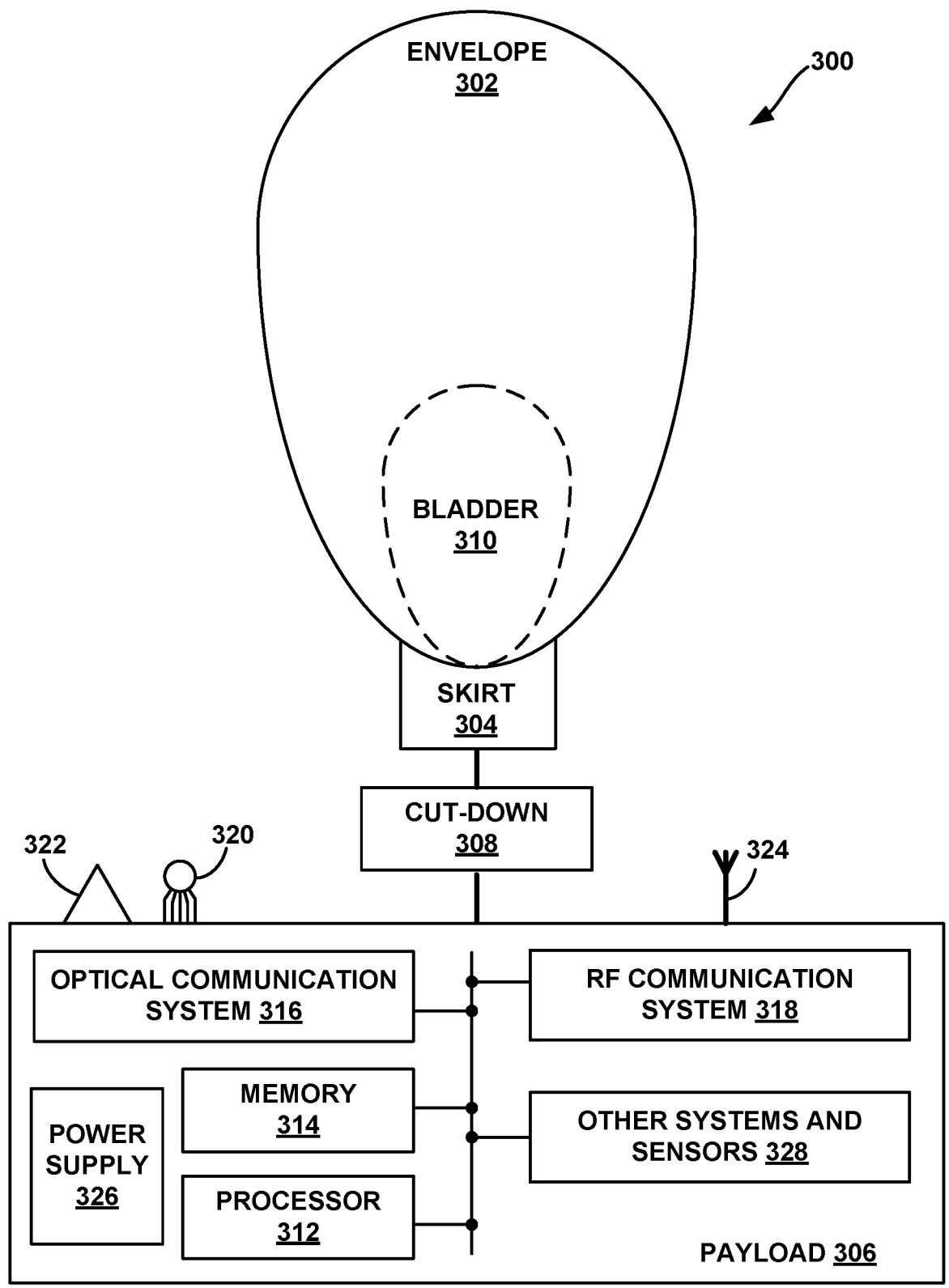
FIG. 3 shows a high-altitude balloon, according to an exemplary embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 324. The payload 306 may also include a power supply 326 to supply power to the various components of balloon 300.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Note that movement and locations of balloons, such as balloon 300, can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

III. HETEROGENEOUS NETWORK WITH OPTICAL AND RF BALLOON-TO-BALLOON LINKS

In some embodiments, a high-altitude-balloon network may include super-node balloons, which communicate with one another via optical links, as well as sub-node balloons, which communicate with super-node balloons via RF links. Generally, the optical links between super-node balloons have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
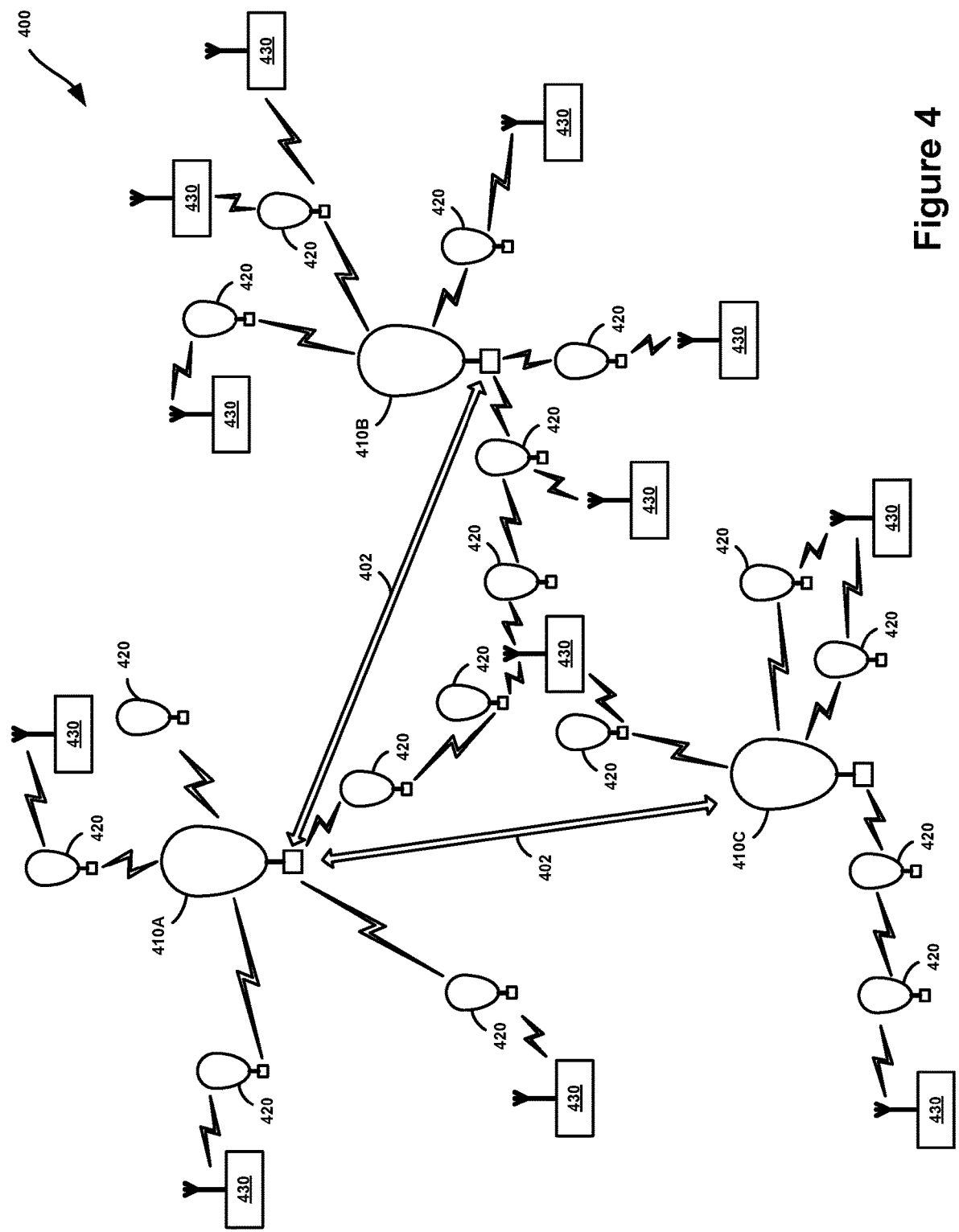
FIG. 4 is a simplified block diagram illustrating a balloon network that includes super-nodes and sub-nodes, according to an exemplary embodiment.

FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec.

A larger number of balloons may then be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to balloon network 400.

IV. WEB INTERFACE EXAMPLES

Various types of network-based interfaces may be provided to provide users with information related to a balloon network and/or to allow users to interact with a balloon network.

A. Interface for Accessing and/or Searching Balloon Network Information

Figure 5A:
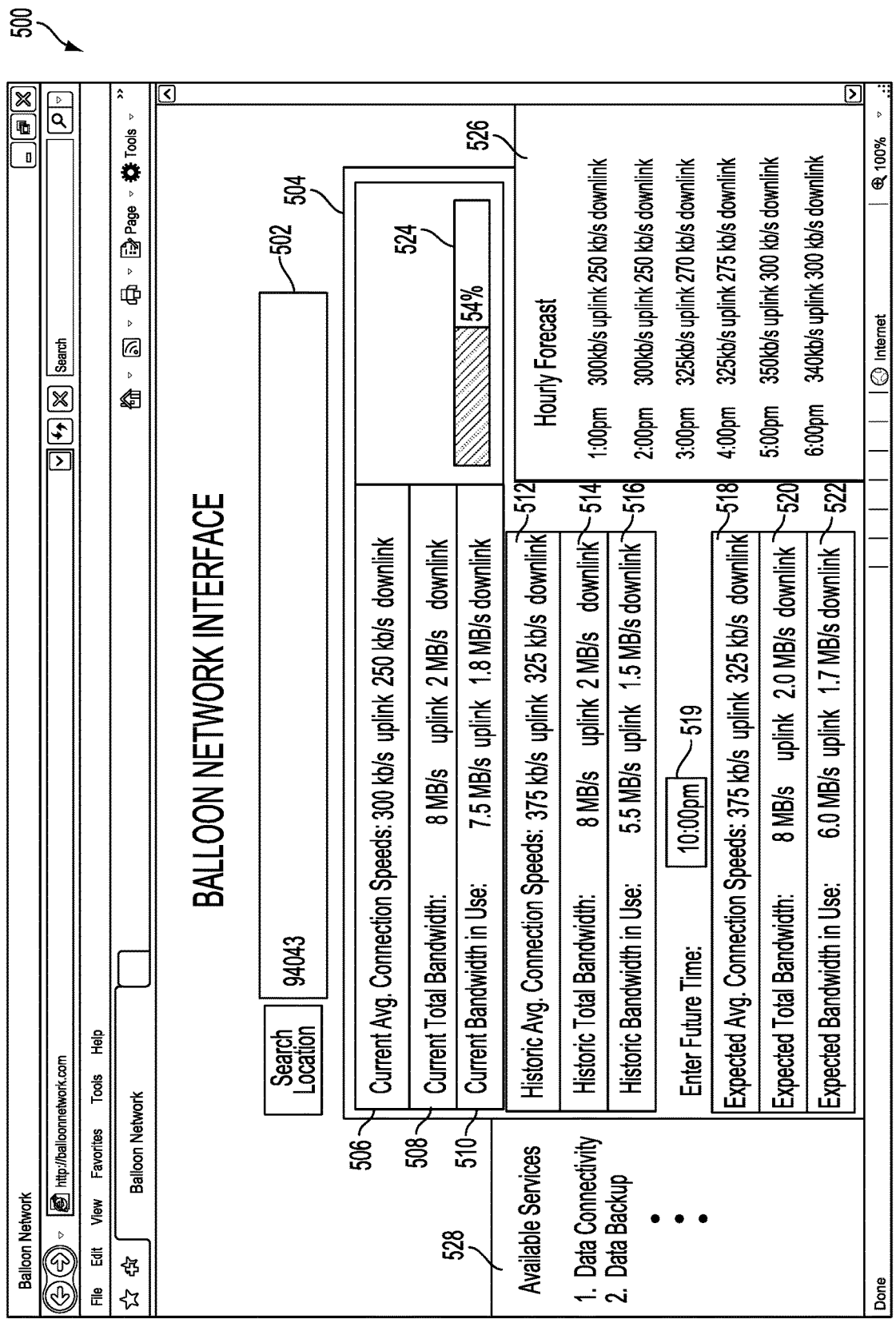
FIGS. 5A and 5B show example screens from a network-based interface for a balloon network via which a user can search for and/or view information related to the services provided by and/or status of a balloon network, according to an exemplary embodiment.
Figure 5B:
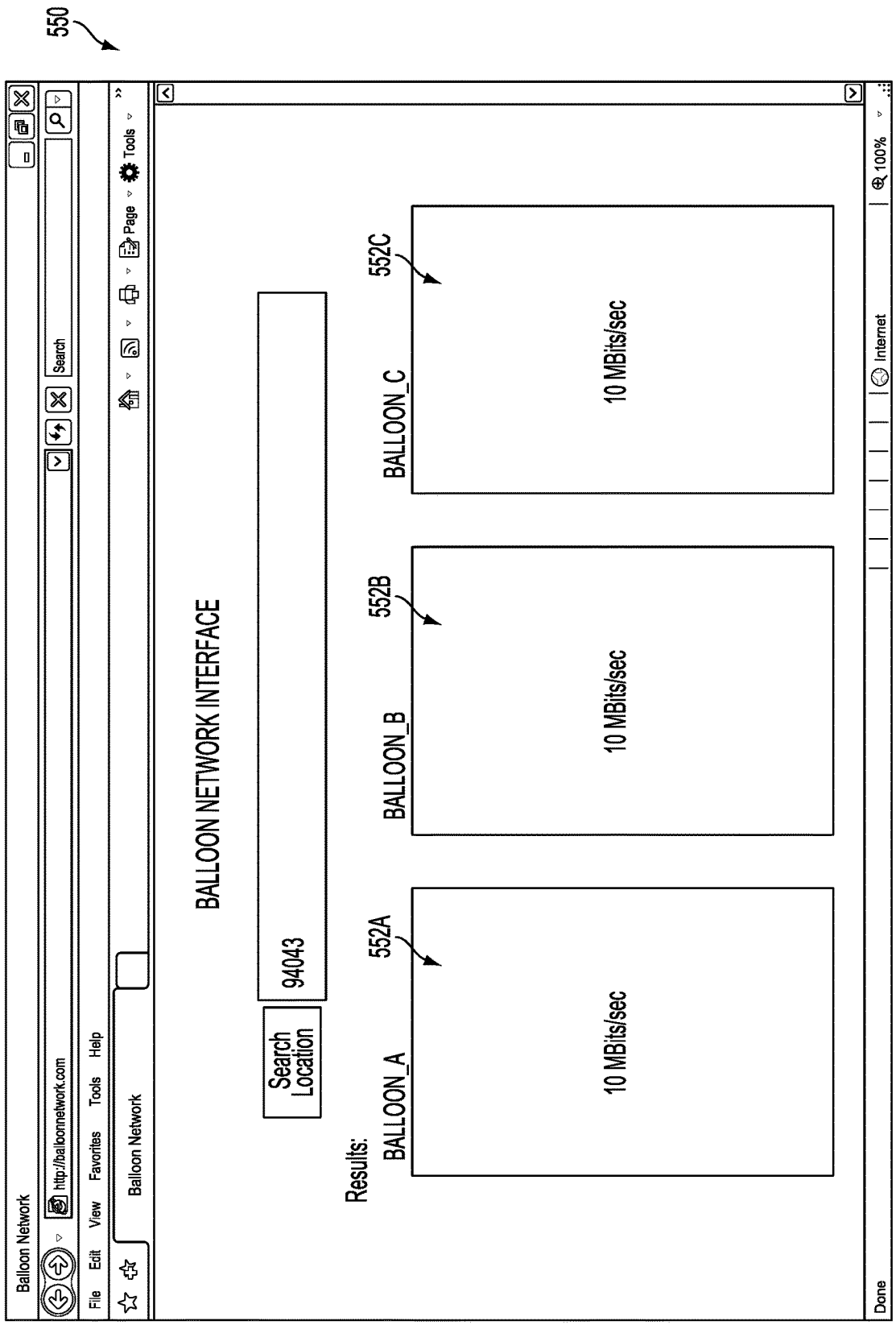

FIGS. 5A and 5B show example screens 500 and 550 from a network-based interface for a balloon network. In particular, screens 500 and 550 provide interfaces via which a user can search for and/or view information related to the services provided by and/or status of a balloon network.

As shown in FIG. 5A, a user may enter a location in a search bar 502. The location may be, for example, an address, a zip code, a city, or a landmark, or may take another form. When a location is entered, a server may search for information related to a balloon network at the entered location, and display some or all of the information located in the search. In the example shown in FIG. 5A, the user has entered the zip code "94043" in the search bar 502. As a result, information related to the status of the balloon network and/or to services provided by the balloon network and/or at or near the "94043" zip code may be displayed in screen 500 (or in one or more different screens that are displayed after the search is initiated).

At a given point in time, the bandwidth that is available from the balloon network may vary from one location to another. Further, the available bandwidth at a particular location may vary over time. This may be particularly so in an example balloon network, where balloons can move dynamically throughout the network's coverage area. Dynamic movement of balloons may result in greater bandwidth fluctuations than occur in a network with fixed nodes, where the total bandwidth fluctuations at a given location result primarily from variations in usage. Accordingly, a web interface may include features to inform users of available bandwidth in different locations. (Note that herein, the term "bandwidth" should be understood to refer to uplink bandwidth, downlink bandwidth, or both, as appropriate.)

In one aspect, an interface such as screen 500 may provide access to location- or area-specific bandwidth information. For example, in FIG. 5A, the search results include bandwidth information 504. In the illustrated example, the bandwidth information 504 includes current bandwidth information such as: (a) the current average connection speeds 506 on the uplink and downlink, (b) the current total bandwidth 508 on the uplink and downlink (which may be the theoretical throughput of all balloons that are serving a location), and (c) current bandwidth in use 510 (e.g., the total bandwidth that is currently being used and/or currently reserved for devices that are connected at or near the location.

Further, bandwidth information 504 includes historical bandwidth information such as: (a) the historical average connection speeds 512 on the uplink and downlink (e.g., per-device uplink and downlink bandwidth over a moving window of a predetermined duration), (b) the historical total bandwidth 514 on the uplink and downlink, and (c) historical bandwidth in use 516 (e.g., the average bandwidth in use over a moving window of time).

Yet further, bandwidth information 504 includes expected bandwidth information. In particular, a future time may be specified in box 519, either by the server or via user input. The screen 500 may then display expected bandwidth information for the time indicated in box 519, such as: (a) expected per-device connection speeds 518 on the uplink and downlink at the indicated time, (b) the expected total bandwidth 520 on the uplink and downlink at the indicated time (which may be based on balloons that are expected to be serving the location at the indicated time), and (c) expected bandwidth in use 522 at the indicated time. Note that the expected bandwidth in use 522 may be determined based on historical bandwidth in use at, e.g., the same time of day, the same day of the week, and/or during the same type of event, among other possible factors.

In a further aspect, screen 500 includes a "bandwidth bar" graphic 524. The bandwidth bar 524 may indicate the percentage of balloon-network resources that are currently in use at a location. For instance, in the illustrated search example, bandwidth bar 524 shows that 54% of the total bandwidth provided by balloons at the zip code "94043" is currently in use and/or is currently reserved for existing connections to the balloon network.

In another aspect, screen 500 includes an hourly forecast feature 526, which indicates expected or predicted bandwidth information in the 94043 zip code at hourly intervals. More generally, an interface for a balloon network may include a feature that provides expected or predicted bandwidth information over time by indicating expected bandwidth information at discrete intervals (e.g., hourly, daily, etc.). Visually, changes in expected bandwidth over time may be represented as a chronological list showing the expected bandwidth information at the particular location at discrete intervals, in the same or similar manner as hourly forecast feature 526. However, changes in expected bandwidth over time could also be visually represented as a graph or histogram with time on one axis and the bandwidth level on the other axis. Other techniques for visually representing expected or predicted changes to bandwidth over time are also possible.

In a further aspect, an interface such as screen 500 may include information related to latency at various locations. For example, an interface could indicate the one way and/or round-trip latency that is currently being experienced, that has historically been experienced, and/or that is expected at a future time, at a given location.

In yet another aspect, screen 500 includes a feature 528 that indicates services that are available from the balloon network at the location indicated in the search bar 502. Such services may include, for example, data connectivity (possibly for a number of wireless protocols), data backup services, and so on.

In some embodiments, an interface to a balloon network may include a search feature via which a user can search by location for information related to the particular balloons that are currently serving a location and/or that are expected to serve a location in the future. For example, in screen 550 of FIG. 5B, the user has again entered the zip code "94043" in the search bar 502. However, in screen 550, the search results include information related to the particular balloons that are currently serving the location. In the illustrated example, balloons A to C are currently providing service in the zip code "94043." As such, the displayed search results 552A to 552C include one search result for each balloon A to C.

It should be understood that the balloon-network information on screens 500 and 550 are non-limiting examples of the information that may be returned when a user searches for balloon-network information for a particular location. In particular, search results may only include some of the information shown in screens 500 and/or 550. Further, search results could include other types of information in addition or in the alternative to the information included in screen 500 and/or 550.

B. Dynamic Balloon-Network Coverage Map

A web interface to a balloon network may include an interactive coverage map, which provides information related to coverage by the balloon network in a geographic area displayed on the map. Such an interactive coverage map might display bandwidth information, and in such case may also be referred to as a bandwidth map. However, an interactive coverage map could also include other coverage-related information, in addition or in the alternative to bandwidth information.

A bandwidth map may be updated from time-to-time based on available bandwidth information. Bandwidth information may change based on a change in position of one or more balloons in the balloon network or the number of client devices operating in the coverage area, among other possibilities. Note that "time-to-time" bandwidth map updates may refer to periodic updates of the bandwidth map, continuous (e.g., real-time) updates of the bandwidth map, or updates of the bandwidth map on an as-need basis, among other possibilities.

In some cases, the bandwidth map may be updated in real-time based on currently-available bandwidth information for the balloon network. For example, bandwidth information for a given location or area may be updated in real-time based on current connection speeds being experienced by client devices at the given location or area (as reported by the client devices and/or determined by the balloons serving the area), and/or based on which balloon or balloons are currently serving the location or area.

Figure 6A:
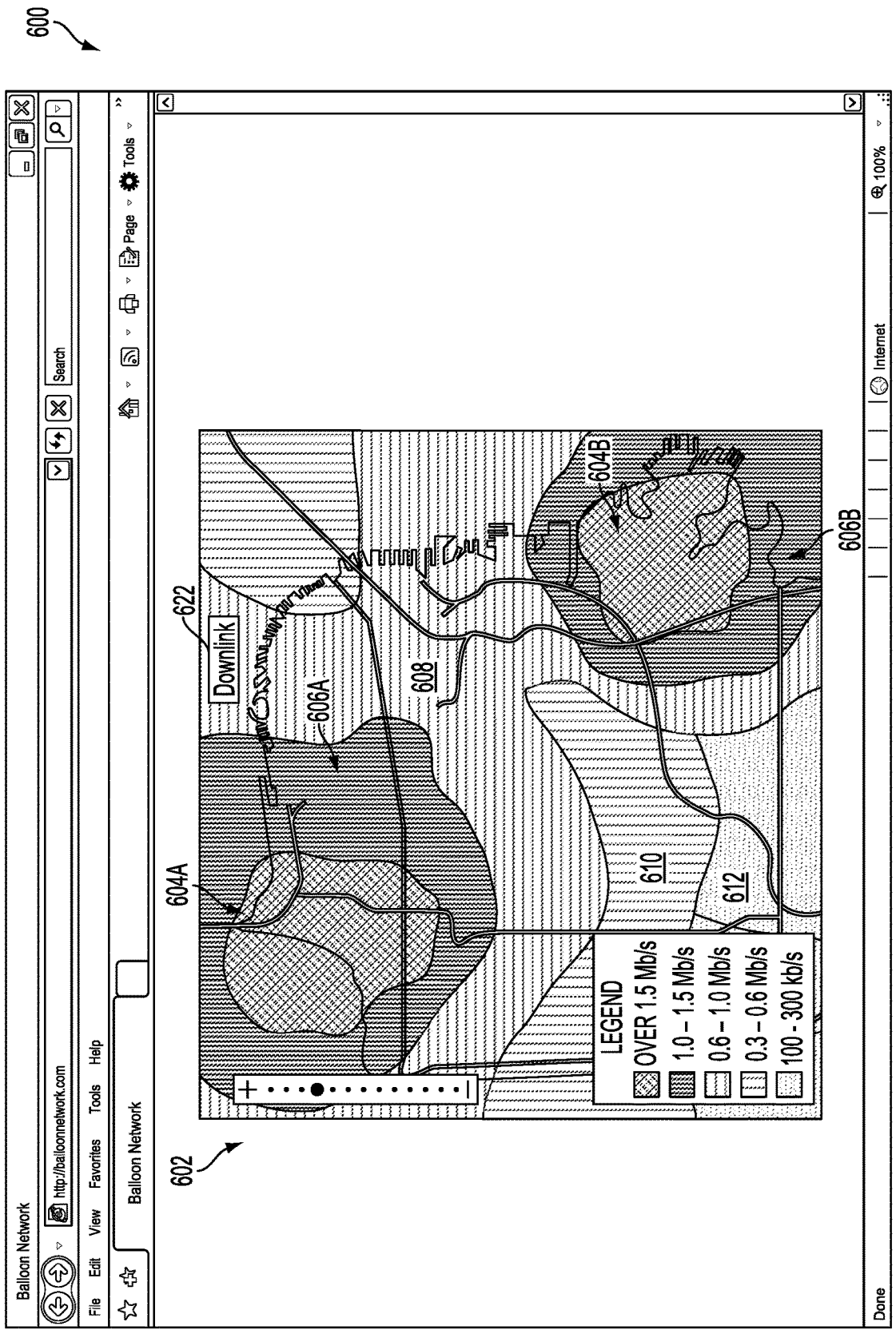
FIGS. 6A and 6B show example bandwidth maps in a network-based interface for a balloon network, according to an example embodiment.
Figure 6B:
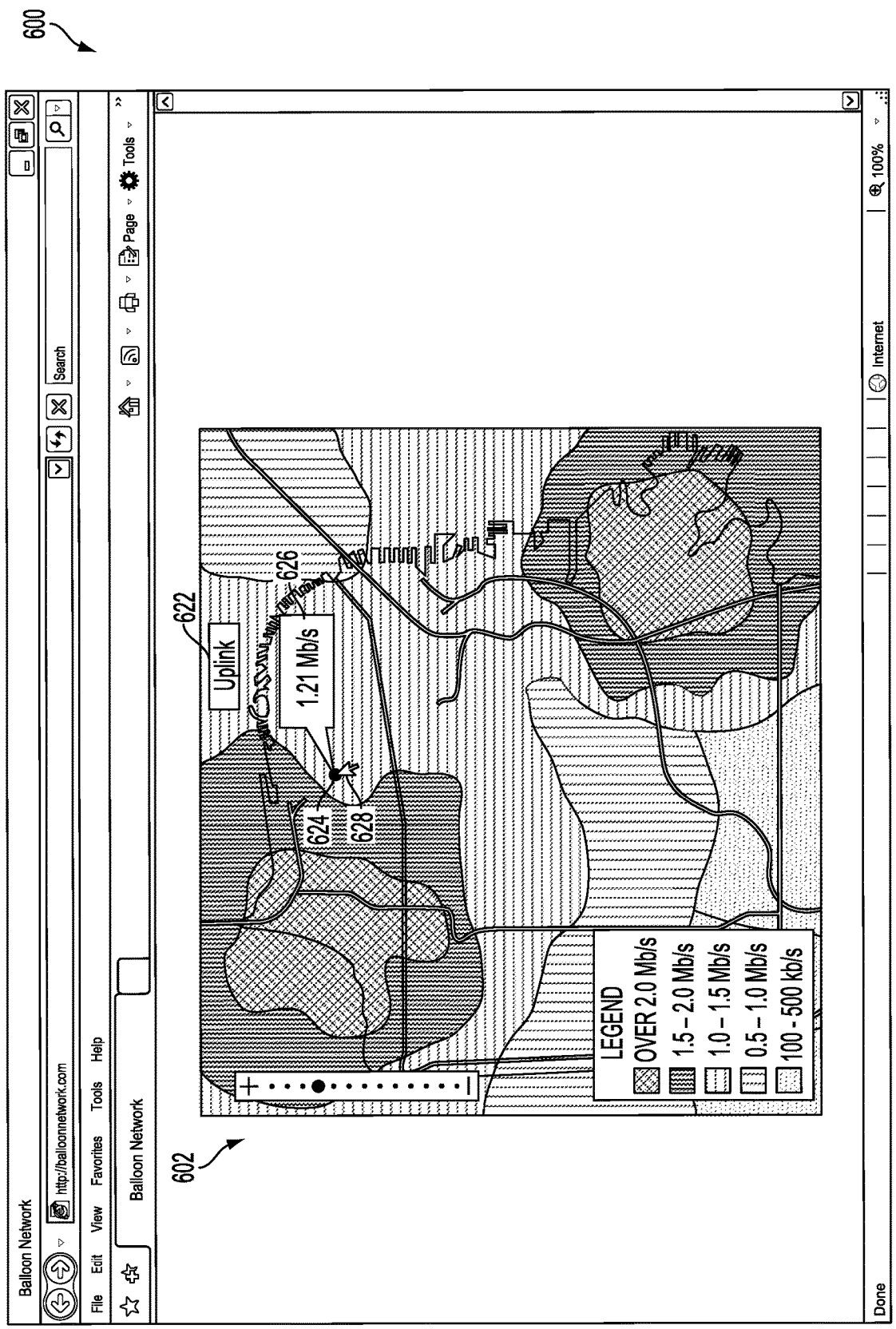

As a specific example, FIGS. 6A and 6B show another screen 600 from a network-based interface, according to an example embodiment. As shown, screen 600 includes a map 602, over which a number of bandwidth regions 604A, 604B, 606A, 606B, 608, 610, and 612, are visually identified. Each bandwidth region 604A-B, 606A-B, 608, 610, and 612 may visually indicate a bandwidth level or a bandwidth range in the corresponding area of the map 602.

More specifically, different colors and/or different patterns may be displayed to indicate different bandwidth levels in different areas on map 602. For instance, in FIG. 6A: (a) the crosshatch pattern shown in regions 604A and 604B may indicate a first bandwidth level or a first bandwidth range in the areas of map 602 enclosed by regions 604A and 604B, (b) the horizontal-line pattern in regions 606A and 606B may indicate a second bandwidth level or a second bandwidth range in the areas of map 602 enclosed by regions 606A and 606B, (c) the vertical-line pattern in region 608 may indicate a third bandwidth level or a third bandwidth range in the area of map 602 enclosed by region 608, (d) the dot pattern in region 610 may indicate a fourth bandwidth level or a fourth bandwidth range in the area of map 602 enclosed by region 610, and (e) the dot pattern in region 612, which is more sparse than the dot pattern in region 610, may indicate a fifth bandwidth level or a fifth bandwidth range in the area of map 602 enclosed by region 612. Further, in an example embodiment, the first bandwidth level or range may be the highest bandwidth level or range, and the amount of bandwidth indicated may decrease incrementally from the first to the fifth bandwidth level or range, with the fifth bandwidth level or range being the lowest bandwidth level or range in the illustrated example.

In other embodiments, different colors could be used to indicate different amounts of bandwidth. For example, if four different bandwidth ranges are defined, then blue, red, yellow, and green could be used to represent the four bandwidth ranges. Additionally, the interface may include a feature to "filter" the colors/patterns displayed based on a selected bandwidth level or range. In particular, user-input may be received (e.g., via search bar 502) requesting to display only colors/patterns indicating a particular bandwidth level or range. Other examples are also possible.

The bandwidth levels or ranges that are indicated in the bandwidth map, such as screen 600, may be defined in various ways. In some implementations, displaying a particular color and/or pattern over a region of map 602 may indicate that the current per-client-device bandwidth (e.g., the current uplink and/or downlink data speeds) for client devices operating in the region is between a lower and an upper per-client-device bandwidth (i.e., a bandwidth range); or, in the case of the color or pattern representing the highest bandwidth range, above a particular lower per-client-device bandwidth (with no upper bound).

In another implementation, the current per-client-device bandwidth may be represented as a bandwidth level. In this case, the current per-client-device bandwidth may be, for instance, an average current per-client-device bandwidth for client devices operating in the region at a specific point in time. For example, at a specific point in time (e.g., a current time of 2:13 PM), three client devices may be operating in a region at downlink speeds of 0.5 Mb/s, 1 Mb/s, and 1.5 Mb/s, respectively. In such an example, displaying a particular color and/or pattern over the corresponding region of the map may indicate an average current per-client device bandwidth level of 1 Mb/s at 2:13 PM. Additionally, the map may also display the time corresponding to the indicated average current per-client device bandwidth level. As a result, the bandwidth map may be animated over time to correspond to changes in bandwidth information.

In particular, screen 600 may be updated from time-to-time (e.g., updated continuously or periodically), to reflect current per-client-device bandwidth (e.g., as a bandwidth range or as a bandwidth level). More specifically, screen 600 may be updated based on, e.g., real-time data indicating current uplink and/or downlink bandwidth being provided via balloon-network connections to client devices that are located in the area represented in map 602.

In other implementations, displaying a particular color and/or pattern over a region of map 602 may indicate that the average per-client-device bandwidth in the region, over a predetermined period of time, is between a lower and an upper bound (i.e., a bandwidth range); or, in the case of the color or pattern representing the highest bandwidth range, above a particular lower bound (with no upper bound).

In yet another implementation, displaying a particular color and/or pattern over a region of map 602 may indicate the average per-client-device bandwidth in the region, over a predetermined period of time, as a bandwidth level. The bandwidth level may correspond to an average per-client-device bandwidth over the predetermined period of time. For example, between 2:00 PM and 2:30 PM, three client devices may be operating in a region. In this period of time, the three client devices may operate at downlink speeds of 1 Mb/s, 1.5 Mb/s, and 2 Mb/s, respectively (e.g., average downlink speed for each client device over the period of time). In this example, the average per-client-device bandwidth level between 2:00 PM and 2:30 PM is 1.5 Mb/s.

In such implementations, screen 600 may be updated from time-to-time (e.g., updated continuously or periodically) in order to reflect average per-client-device bandwidth over a moving window of time (e.g., over the last ten minutes, hour, day, etc.). Other example implementations may also be possible.

Note that a moving window of time over which the average bandwidth is measured, may be selected in view of the dynamic movement of balloons throughout a coverage area of a balloon network. For example, available bandwidth may change more rapidly in a first area where balloons are moving faster with respect to the ground, than in a second area where balloons are moving slower with respect to the ground (as compared to the movement of balloons in the first area). Accordingly, the window of time over which bandwidth levels are averaged may be shorter for locations where balloon speeds relative to the ground are higher, in order to account for potentially-greater variations of available bandwidth in such locations.

In an example embodiment, screen 600 might only display uplink or downlink bandwidth ranges at any given point in time. In such an implementation, separate bandwidth ranges may be defined for the uplink and downlink. Further, the particular ranges defined for the uplink may differ from those defined for the downlink. For example, consider a scenario where downlink bandwidth ranges are displayed in FIG. 6A and uplink bandwidth ranges are displayed in FIG. 6B. In FIG. 6A, the downlink bandwidth ranges illustrated by different patterns include 100-300 kbps, 0.3-0.6 Mb/s, 0.6-1.0 Mb/s, 1.0-1.5 Mb/s, and over 1.5 Mb/s, and in FIG. 6B, the uplink bandwidth ranges illustrated by different patterns include 100-500 kbps, 0.5-1.0 Mb/s, 1.0-1.5 Mb/s, 1.5-2.0 Mb/s, and over 2.0 Mb/s.

In a further aspect, a user could toggle between uplink and downlink views on an interface such as screen 600. For instance, the user may click an uplink/downlink toggle button 622 in screen 600 to switch between the uplink and downlink views shown in FIGS. 6A and 6B, respectively. However, note that in some implementations the map 602 may display uplink information and downlink information simultaneously.

In an example embodiment, since the colors or patterns over the map 602 may only indicate a general bandwidth range, screen 600 may further provide a mechanism for viewing bandwidth information at specific locations within a given bandwidth region. For example, if a user hovers an icon 628 over, clicks on, or otherwise identifies or selects a specific location 624 on map 602, bandwidth information on the specific location 624 may be displayed. In the illustrated example as shown in FIG. 6B, a graphic is displayed indicating that the current per-client-device bandwidth is 1.21 Mb/s at location 624. When a location on the map is selected, this may be processed in the same way as a search for the selected location via the search bar 502.

In a further aspect, screen 600 may provide a mechanism for viewing bandwidth information at a selected area within a given bandwidth region. For example, if a user circles, draws, or otherwise identifies or selects an area on map 602, bandwidth information for the selected area may be calculated and responsively displayed. Note that the user may draw (or identify in other ways) any shape on the screen 600, for example, by clicking and dragging a cursor to define the selected area on the map 602.

In the above example implementations, screen 600 is described as providing information related to per-client-device bandwidth; e.g., information related to the uplink and/or downlink bandwidth that is currently, historically, and/or expected to be allocated to each individual client device in a given area. For instance, if a region of map 602 is a particular color or pattern, this may indicate to the viewer that the average uplink bandwidth provided to each client device in the region, as measured across all client devices or a sample set of client devices that are currently in the area, is within a certain range. However, a bandwidth map could indicate other measures of bandwidth, in addition or in the alternative to per-client-device uplink and/or downlink bandwidth.

In some embodiments, a bandwidth map could visually indicate different ranges of total bandwidth provided by a balloon network. Specifically, a server may determine the total amount of uplink and/or the total amount of downlink bandwidth that is provided by the balloon network at a given location; e.g., by summing the bandwidth provided by all the balloons that serve the given location. For instance, if there are three balloons that are currently providing data service at a given location, and the total uplink bandwidth provided by each balloon is 1.0 Gbit/s, then the current total uplink bandwidth at the location may be determined to be 3.0 Gbit/s. The server may then repeat this calculation for number of locations throughout the coverage area of a balloon network, and to the extent necessary, interpolate between locations to determine regions on a map that fall within certain predefined total-bandwidth ranges. The bandwidth map may then display particular colors or patterns, which each correspond to a particular total-bandwidth range, to identify regions where the total bandwidth generally falls within the corresponding total-bandwidth ranges.

In some embodiments, a bandwidth map could visually indicate regions in a balloon network's coverage area having different in-use bandwidth levels; e.g., by displaying different colors and/or patterns to indicate regions in which in-use bandwidth levels falling within different in-use bandwidth ranges. For instance, a server may determine the total amount of in-use uplink and/or downlink bandwidth at each of a number of locations throughout a coverage area. A server may then group neighboring locations that have in-use bandwidth levels within the same bandwidth range, and use these groupings to define the bandwidth regions that are displayed on the map.

Further, a bandwidth map could visually indicate regions in a balloon network's coverage area having different unused bandwidth levels; e.g., by displaying different colors and/or patterns to indicate regions in which unused bandwidth levels falling within different unused bandwidth ranges. To do so, a server could determine the total amount of in-use uplink and/or downlink bandwidth, as well as the total bandwidth provided by the balloon network, at each of a number of locations throughout a coverage area. The server can then subtract the in-use bandwidth from the total bandwidth to determine the unused bandwidth at each location. A server may then group neighboring locations that have unused bandwidth levels within the same bandwidth range, and use these groupings to define the bandwidth regions that are displayed on the map.

In an example embodiment, the interface may be configured to display bandwidth information corresponding to bandwidth levels or ranges expected (e.g., based on a determination or a prediction) to be allocated to client devices in a given area at a future point in time. Such future bandwidth information may be determined (or predicted) based on: historical bandwidth information, bandwidth service requests, event reporting, information received from client devices, and/or fleet-planning decisions for the balloon network, among others.

In one example, historical bandwidth information may correspond to historical bandwidth data for a particular area at: (i) different times of the day, (ii) different times of a particular month, (iii) different times of the year, among others. Such historical bandwidth information may be stored, for example, on a remote server and may be accessible to the system upon request for use in determining and responsively displaying future bandwidth information. As such, future bandwidth information may be determined based at least in part on the historical bandwidth information.

In another example, information may be received from a client device related to an expected future position of the client device. Such information may include, for instance, calendar event information associated with the client device and/or navigation information (e.g., GPS information) received from the client device, among other possibilities. Based on the received information, the system may determine (or predict) whether a client device will be present in an area at a future point in time and responsively update the future bandwidth information. Other examples may also be possible.

In an example embodiment, a system that supports an example interface may utilize various techniques in order to intelligently determine the boundaries of areas that fall within different bandwidth ranges. For example, bandwidth levels could be measured at a number of discrete locations (e.g., at a number of end-user devices that are connected to the balloon network or at a number of balloons). The system may then dynamically group the locations according to bandwidth ranges. In some implementations this may involve some interpolation of bandwidth levels between the levels measured at the discrete locations in order to define areas that fall within different bandwidth ranges. This process may then be repeated periodically or continuously in order to provide an up-to-date bandwidth map.

Additionally, the bandwidth ranges into which the discrete measurements are grouped could be dynamically determined based on the amount of variation in bandwidth that typically occurs in the area being shown on a bandwidth map. For example, there may be less variation in bandwidth in a smaller area (e.g., a city) than in a larger area (e.g., an entire country), and thus the bandwidth ranges into which the discrete bandwidth measurements are grouped may be adjusted to be more granular on a map showing a smaller area.

Further, in some cases, the interface may include a feature to zoom in on a particular area of the map 602 or zoom out of a particular area of the map. In this case, the determined boundaries of areas that fall within different bandwidth ranges may be updated as user-input is received (e.g., by clicking on a + or − button) to zoom in or out on the map 602. For example, the system may determine boundaries corresponding to regions A, B, and C on the map 602. Subsequently, user-input may be received from a viewer of the map 602 to zoom in on region A of the map 602. In response, the system may redetermine the boundaries of areas that fall within different bandwidth ranges and thereby display updated regions on the map 602 corresponding to the redetermined boundaries (e.g., as sub-regions of region A). Note that similar techniques may also be applied in the context of other changes to the map such as panning through the map, among others.

In an example embodiment, a map interface may show variation of other performance measures throughout the coverage area of a balloon network in a similar way as the above examples show bandwidth variation. The other performance measures may include but are not limited to: latency data, throughput data, jitter data, and error data. For example, a map interface could show geographic areas where the one way and/or round-trip latency falls within different latency ranges or levels. Further, a map could show current latency, historical latency, and/or latency levels that are expected in an area at a future time.

Herein, the terms "map" and "map interface" should be understood to include various types of graphical objects, images, and interfaces. A map could be a two-dimensional map; e.g., a map that includes a graphical projection of a spherical surface, such as the earth's surface, onto a flat surface, and/or that includes aerial photographs of the earth. A map could also be a 2.5D or 3D graphical object, which the user may be able to interact with. For example, a map could be a spherical model of the earth that the user can rotate, zoom in and out on, and so on. A map may take on other forms as well, without departing from the scope of the invention.

Further, a map or map interface may include various interactive features. For example, a user may be able to interact with a map by zooming in and out and/or panning through the map. Further, a map could include layers, such as layers for radar imagery, storm patterns, cloud cover, animated balloon locations, bandwidth levels, network-usage levels, and/or traffic, among other possibilities. In some embodiments, a map interface may provide a feature that allows users to individually switch such layers on and off, so that the user has control over which layers are and are not displayed. A map may additionally or alternatively include other features, without departing from the scope of the invention.

C. Balloon-Location Map

Figure 7A:
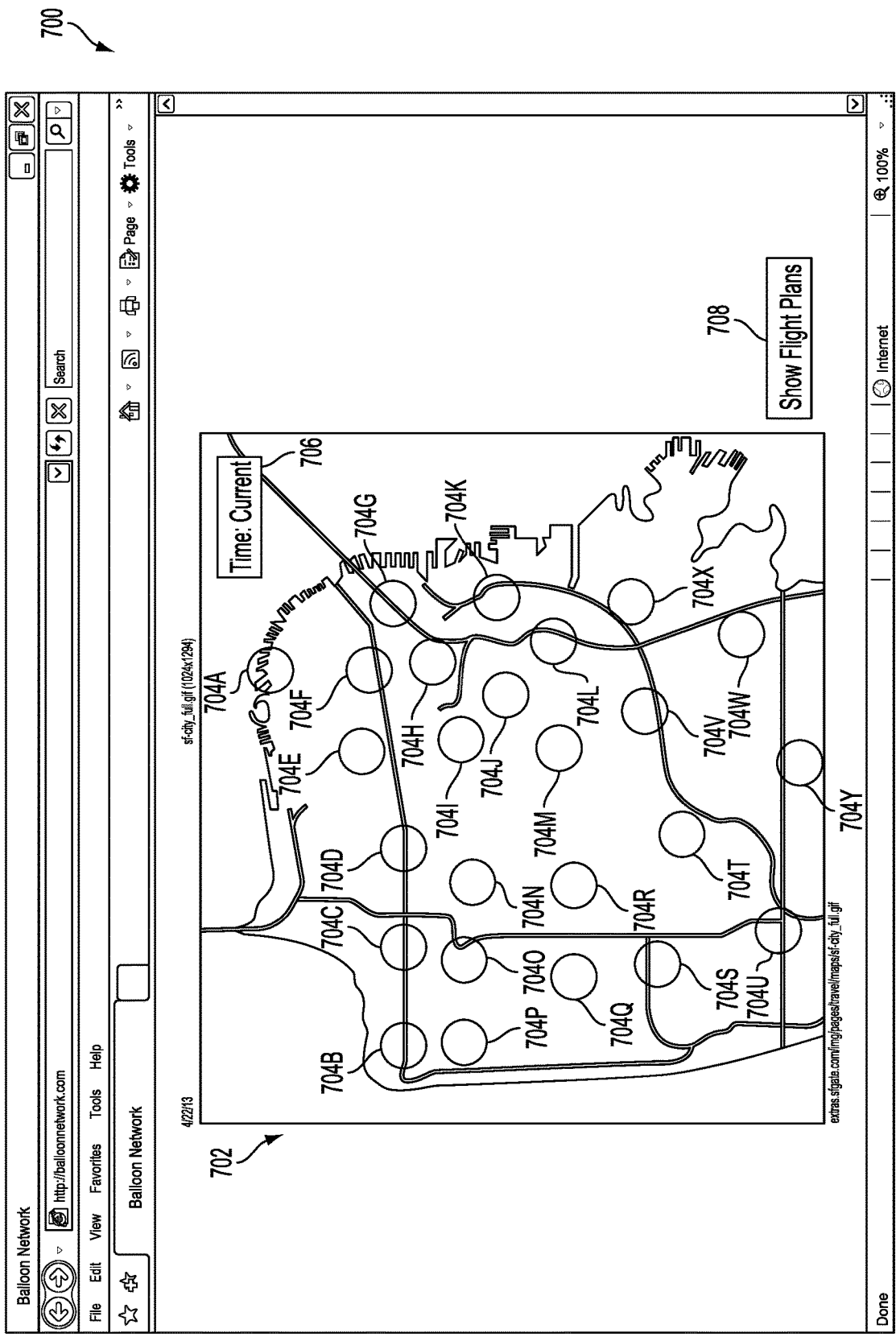
FIGS. 7A, 7B, and 7C show example balloon location maps in a network-based interface for a balloon network, according to an example embodiment.
Figure 7B:
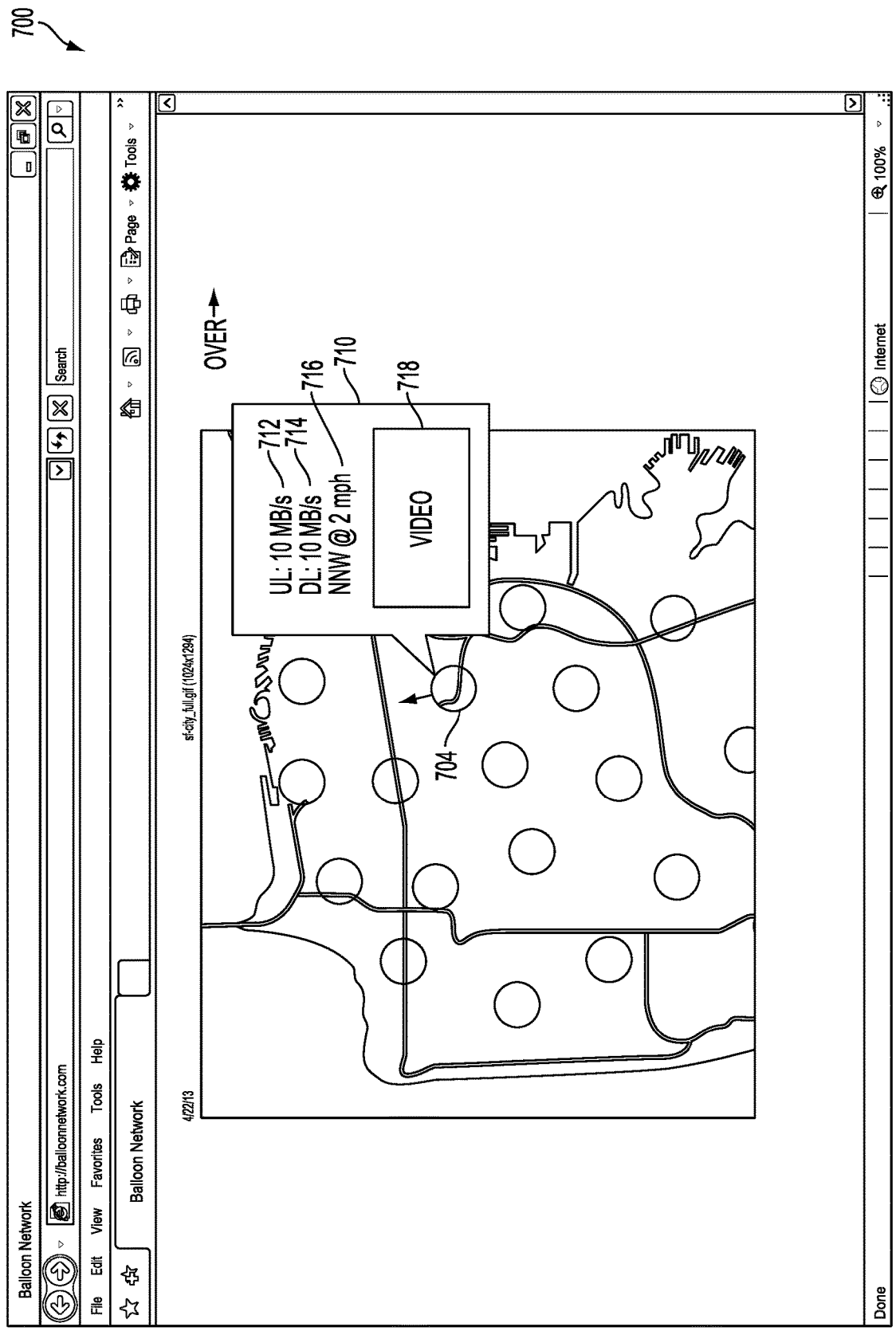
Figure 7C:
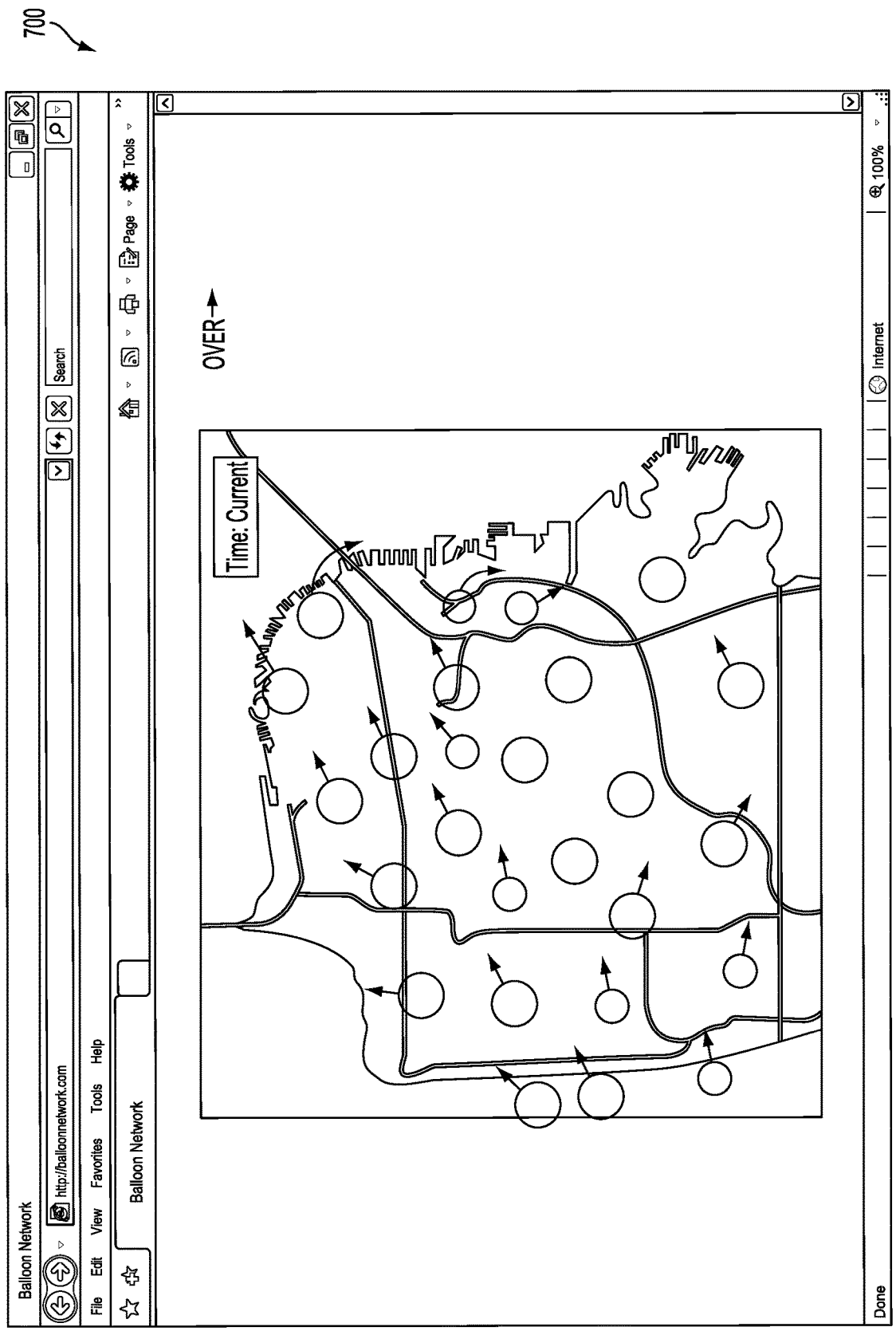

In some embodiments, a web interface may include a map feature that shows the current locations of balloons, and possibly other information such as the expected trajectories for the balloons. For example, FIGS. 7A to 7C shows a screen 700 from a network-based interface, according to an example embodiment. Screen 700 includes a map 702, and a number of balloon icons 704A to 704Y that are displayed over the map. The locations of balloon icons 704A to 704Y on map 702 may indicate the current geographic locations of balloons in the area shown in map 702.

In a further aspect, a web interface could include a feature for viewing expected balloon locations at a future time. For instance, as shown in FIG. 7A, screen 700 includes a time field 706. As such, a user might input a particular future time in time field 706, and the map may responsively update such that balloon icons are displayed over map 702 at the expected locations of balloons in the area at the indicated future time. Other examples are also possible.

In another aspect, a user may be able to select a given one of the balloon icons 704A to 704Y to bring up information related to the corresponding balloon and/or to access functionality related to the corresponding balloon. For example, a user could select a given balloon icon 704A to 704Y to view information about the corresponding balloon, such as a balloon ID number, model number, balloon system information, balloon capabilities, etc.

As another example, a user could select a given balloon icon 704A to 704Y to view data gathered by sensors on the balloon, such as temperature, wind speed, air pressure, speed, altitude, direction of travel, etc. The sensor data may be displayed for a single point in time or over a period time (e.g., as a graph). Further, in some embodiments, the displayed sensor data may be updated in real-time, based on a real-time data feed from the balloon. As yet another example, a user could click on a balloon icon to access a real-time feed from a camera on the balloon.

FIG. 7B shows screen 700 after a balloon icon 704C has been selected. More specifically, when balloon icon 704 is selected, a status box 710 may be displayed that includes information related to the corresponding balloon and/or based on sensor data from the balloon. In the illustrated example, box 710 includes an uplink bandwidth field 712, a downlink bandwidth field 714, and a trajectory field 716 indicating a direction and speed of the balloon.

In some embodiments, when a user selects a balloon icon 704A to 704Y, the map interface may display a current flight plan or a number of possible flight plans on the map (e.g., by displaying a line representing the path for each flight plan, with each line starting from the balloon's location on the map and extending along a path of travel). For example, screen 700 includes a "Show Flight Plans" button 708. When a user clicks on or otherwise selects the "Show Flight Plans" button 708, the screen 700 may be updated to show flight plans for the balloons in the area over a given period of time, as shown in FIG. 7C.

In some embodiments, a balloon-location map interface could also include some or all features of a bandwidth map as described above. Provided with such a map interface, a user view the bandwidth range for an area, and could select a particular balloon in the area to view more specific bandwidth information related to the balloon, such as the balloon's total bandwidth, in-use bandwidth, historically-available bandwidth, and/or forecasted total and/or available bandwidth. Such an interface might also allow a user to select a balloon icon on the map in order to access an interface feature for requesting service from the particular balloon, and possibly make or set up a payment for the requested service.

D. Weather-Map Interface

In some embodiments, temperature and wind data acquired by balloons in a balloon network could be used to update a stratospheric weather map in real-time. Note that balloons could also provide such weather-related data to existing weather services for use in their corresponding web interfaces.

E. Service Requests and Payments

A web interface may include features that allow users to make requests and/or purchase various types of services related to the balloon network. Such an interface feature might be accessible via a search interface such as that shown in FIGS. 5A and 5B, via a map interface such as that shown in FIGS. 6A-6B and/or FIGS. 7A-7C, or accessed in another away.

In an example embodiment, a web interface may allow users to request a service for a particular location. Additionally, service could be requested immediately/as soon as possible, or requested for a future time. In some cases, the web interface may also include a feature to allow a user to specify the duration of time for using the requested service. Further, a particular quality of service may be requested by specifying desired performance in the form of, for example, a particular bandwidth level or a request for latency reduction, among others. Specifying the particular location, a requested time, the duration, and/or quality of service may allow the balloon network to carry out fleet-planning decisions accordingly.

The interface may allow for requests in various ways. For example, a user could access a dedicated screen where they could enter the information needed to request service at a particular location (from any balloon or balloons that are available), and possibly make a payment for the requested bandwidth. Such an interface could be similar to interface 850 as further discussed below in association with FIG. 8B, without the features related specifically to event reporting, or could take on another form.

Figure 8A:
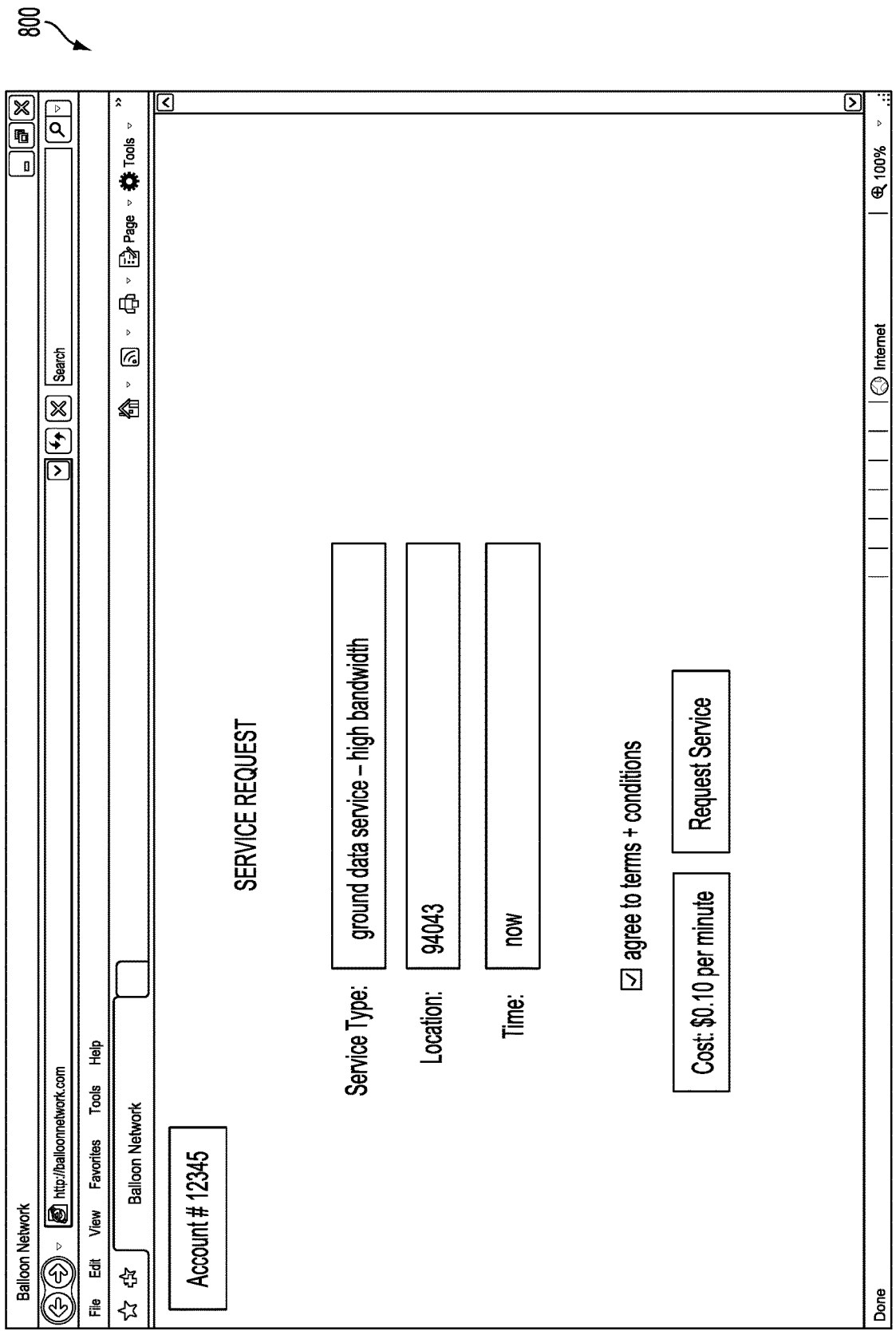
FIG. 8A illustrates an interface for requesting a service from a balloon network, according to an example embodiment.

For example, FIG. 8A shows an interface 800 for requesting a service from a balloon network, according to an example embodiment. In the illustrated interface 800, the user may have logged on to their account, indicated a type of service they desire (e.g., ground data service—high bandwidth), the location the service is desired (e.g., the 94043 zip code), and/or the time the service is desired (e.g., now or a future time). The interface may then display a cost for the requested service (e.g., $0.10 per minute), which the user can then elect to pay for by clicking a "request service" button. Note that the cost for the requested service may be determined (or predicted) based on various factors such as, for example, expected resource availability at the specified time and location. Other examples are also possible.

Note that the location the service is desired may be specified in various ways. For instance, a user may specify a localized area (e.g., a user's home), a large local area (e.g., a park or a bike path), or a large non-local area (e.g., a highway over which a user is traveling on a road trip), among other possibilities.

In a further aspect, interface 800 may include a feature to remember a user's service request (not shown). For instance, interface 800 may include a checkbox that a user can select to allow the system to store information associated with the request. Such stored information may be accessible by the user via interface 800 at a future time, thereby allowing the user make the same or a similar request in the future. Additionally, the information may be stored on a remote server and may be accessible via one or more client devices associated with a user-account.

In yet a further aspect, interface 800 may also include a feature to allow for requesting automatic initiation of a requested service based on various selected factors. In one example, a user's service request may indicate to the balloon network to automatically provide coverage to the user's mobile device at any time that the user (or more specifically, the user's mobile device) is determined to be present at a specified location. Such a determination can be made, for example, based on information received by the balloon network from the mobile device (e.g., GPS coordinates).

In another example, a user's service request may indicate to the balloon network to automatically provide coverage to the user's mobile device at specified times (e.g., in addition to a specified location). The specified times may indicate specific times of the day, specific days of the week, or specific times of the year, among other possibilities. Note that a time may be specified without specifying a location, thereby allowing for automatic initiation of a requested service at specified times but independent of location (assuming sufficient resource availability at the location of the mobile device during the specified times).

In an example embodiment, a user could click on a balloon icon on a map interface, such as those shown in FIGS. 7A to 7C, in order access an interface feature via which the user can submit information needed to request service from a particular balloon (e.g., a time, the location, desired bandwidth level or quality of service, etc.), and possibly make a payment for the requested service.

In an example embodiment, a user could select a particular location on a map interface, such as on the bandwidth map interface shown in FIGS. 6A and 6B, in order access an interface feature via which the user can submit information needed to request service at or near the particular location. For example, using a mouse, a user could click on a location on a map to request service from the balloon network at or near the location.

Additionally, a map interface (e.g., a bandwidth map) may be configured to update based on a plurality of service requests. For instance, colors/patterns representing varying bandwidth levels or ranges in a geographic area may update from time-to-time as service requests are received requesting, for example, a desired bandwidth level. Requests for immediate service may result in instantaneous updates of the map (or updates within a predetermined time period). In contrast, requests for service at a future time may result in updates of the map at or around the specified time. Alternatively, requests for service at a future time may be reflected on the map when user-input is received to view, for example, future bandwidth information on the map.

In a further aspect, the map interface may include features to allow a user to view an impact of a service request on the bandwidth information in the map prior to execution of the service request. For instance, the interface 800 shown in FIG. 8A may include a "preview bandwidth information" button (not shown), which may allow a user to access a map interface previewing the impact (e.g., based on the desired quality of service) of the service request at the requested location and time. In particular, the map interface may display colors/patterns indicating determined (or predicted) bandwidth levels or ranges at or near the location and time of the desired service request. Such a feature may allow a user viewing the interface to know if the balloon network has sufficient resources (at or near the specified location and at the specified time) prior to execution and payment for the service request.

In an example embodiment, an interface may be provided via which a user could request that service be provided to a particular device or group of devices (e.g., a device or devices that are associated with the user's account with the balloon network). In the case where service is requested for a mobile device, the request may be made generally, without specifying any particular location. Thus, the user may effectively be requesting that balloons move so that coverage follows the user (or more specifically, the user's mobile device) as it moves throughout a coverage area.

For instance, consider a situation where a user is on a road trip between a first city and second city. In this case, a user may specify a starting point in the interface as the first city, a destination point as the second city, a start time for the road trip, and/or a specified route, among others. Subsequently, the user may specify, on the interface, a request for service over the whole (or part of the) specified route. In one case, balloons in the balloon network may move to provide coverage during the road trip by receiving location updates from a device (e.g., a device installed in the user's car, or a user's cell phone). In another case, the user may provide, in the interface, additional information related to the user's travel plans (e.g., estimated speed (mph), anticipated rest stops, etc.) such that balloons in the balloon network can move to provide coverage along the route using the additional information.

Note that in such a case the coverage area may be large enough to provide a buffer such that the user can, for example, get ahead or fall behind (i.e., based on the travel speed) by some amount without falling outside of the moving coverage area. In some implementation, the interface may provide features to allow the user to pay more for a larger buffer area. Other examples may also be possible.

In an example embodiment, an interface may include one or more features for specifying a priority level for the request. For instance, the interface may include a checkbox that a user can select to indicate a particular priority level. In one example, the priority level could represent, for instance, an emergency or non-emergency priority. Accordingly, balloons near the specified area where the bandwidth is needed could provide services preferentially (or only) to those with specific 'emergency' priority-level access. 'Emergency' priority-level access could be provided to first-responders, fire-fighters, police, dispatchers, other emergency personnel, news organizations, witnesses, or survivors, etc.

In another example, the priority level could be associated with various pricing levels (e.g., pay a higher rate for priority access to Internet bandwidth, etc.). For instance, a basic level of communication services (e.g., limited download speeds, capped bandwidth, etc.) could be provided by the high-altitude balloon network for a basic fee. For an increased rate, a one-time payment, or another form of compensation, a higher level of services could be provided. The higher level of services could represent access to, or privileges for, higher data rates, removal of data cap amounts, etc. Other types of priority levels are possible.

In a further aspect, the interface may include one or more feature for indicating/displaying current or future priority levels. For instance, a user may access a map interface, such as the map interfaces shown above in association with FIGS. 6A-6B and 7A-7C. The map interface may indicate current or future priority levels for various regions in the geographic area displayed on the map. The priority levels may be indicated based on, for example, colors/pattern on the map and/or a priority level rating in the corresponding region (e.g., "10" representing high priority and "1" representing low priority), among other possibilities. Such interface features may allow a user to see information relevant to priority levels of the balloon network at specified times and locations. Other examples may also be possible.

F. Event-Reporting Interface

A balloon-network interface may include a feature that allows users to report a location where an event is occurring, so that a balloon network may provide services related to the event or take the event into account in a fleet-planning process. Such an event-reporting feature may be evaluated by the balloon network as a request and/or a vote for services (e.g., bandwidth) in a time and location associated with the reported event.

Figure 8B:
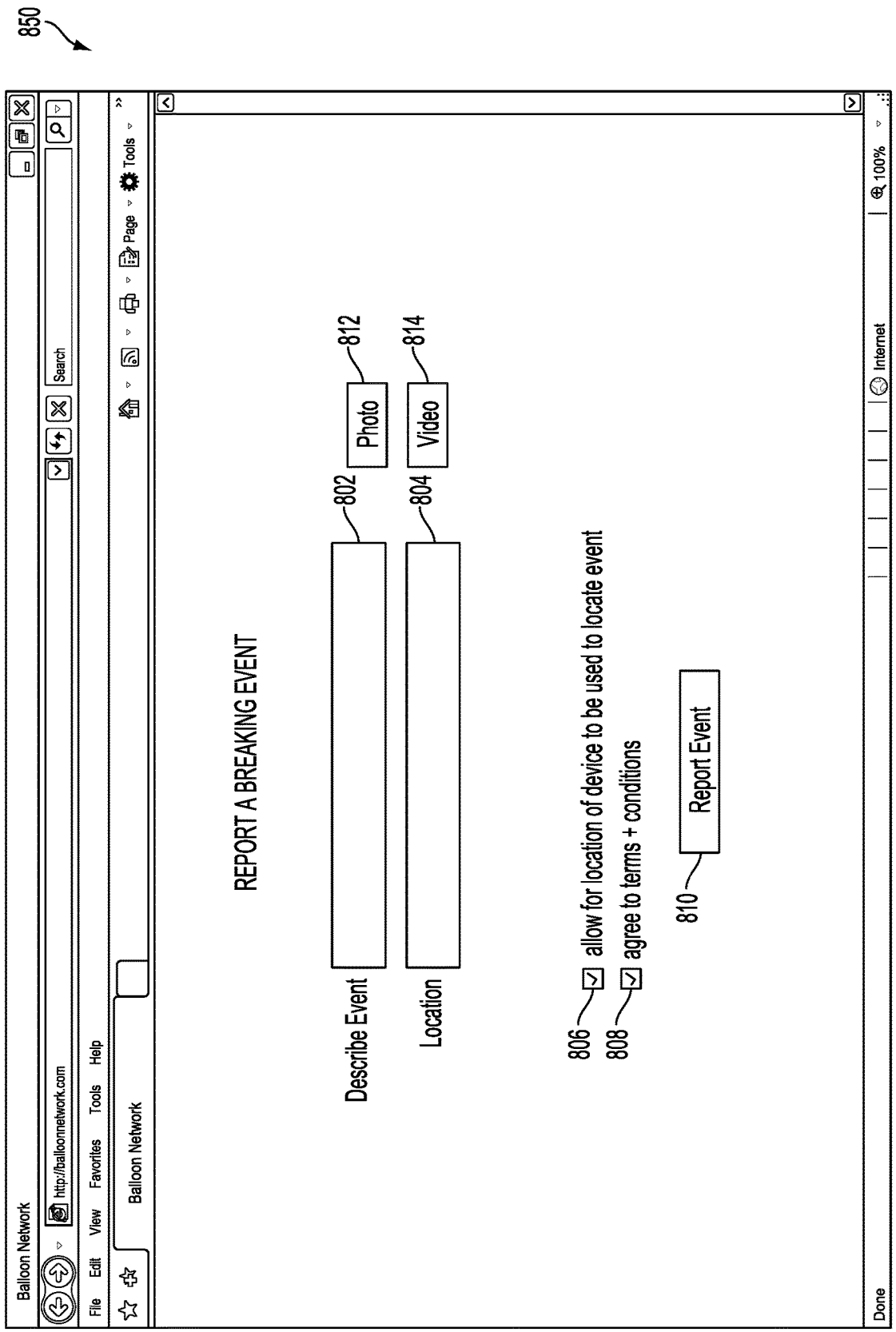
FIG. 8B illustrates an interface for reporting an event, according to an example embodiment.

For example, FIG. 8B illustrates an interface 850 for reporting an event, according to an example embodiment. In particular, a user may describe an event in an event field 802, and indicate a location of the event in location field 804. Further, interface 850 may include a checkbox 806 that a user can select to allow location information (e.g., GPS coordinates) of the device on which they are viewing interface 850 to be used for purposes of locating the event. Additionally or alternatively, an example interface 850 may include a checkbox 808 that a user can select to agree to terms and conditions associated with reporting an event via the interface 850. Once a user agrees to the terms and conditions, a report event button 810 may be selected to submit the information provided in fields 802 and 804.

Further, interface 850 may include features that allow the user to include media content associated with the event when the user reports the event. For example, interface 850 includes: (a) a photo button 812, which may be selected to bring up an interface feature via which a user can submit a photo of the event, and (b) a video button 814, which may be selected to bring up an interface feature via which a user can submit a video of the event. Other types of features that support user-provided media content are also possible.

In an example embodiment, interface 850 may include features that allow the user to specify additional individuals with client devices that are (or will be) present at the reported event. Such a specification may be done by indicating, for example, user-accounts associated with the additional individuals' client devices. As such, a user indicating the additional individuals may allow the control system to adjust the fleet-planning process based on the number of client devices expected at the reported event.

In a further aspect, a network control system may then aggregate the information received from a number of users via an interface 850 to, e.g., determine a location where a breaking event is occurring. For instance, when the control system determines that there are more than a threshold number of event reports at or near a particular location, the control system may interpret this as an indication that there may be an important event (e.g., a breaking news story) occurring at the particular location.

Accordingly, the control system may adjust its fleet plan for the balloon network in an effort to send resources to the location where the event is believed to be occurring. For example, the control system could make efforts to increase the number of balloons at or near the location in order to increase the bandwidth available at the location. More generally, in a balloon network with different types of balloons (e.g., a heterogeneous network), the control system may adjust its fleet planning process to adjust the mixture of different types of balloons, and/or the number of a particular type of balloons, in an effort to provide appropriate resources and/or functionality in a particular location. Other examples are also possible.

Note that while interface 850 is designed for a "breaking" event (e.g., an event that is currently happening), a similar interface may be used to allow users to indicate future events. In such an interface, features may be added that allow a user to indicate timing information related to when the event is scheduled or is expected to occur (e.g., a timeframe, a start time, and/or an end time).

In an example embodiment, the locations of reported events may be displayed on a map, such as the bandwidth map discussed above in association with FIGS. 6A and 6B. For instance, a bandwidth map may display locations of reported events overlaying the colors/patterns indicating varying bandwidth levels or ranges in the geographic area displayed on the map. An indication of a reported event location may be in the form of, for example, a dot or a pin displayed at the appropriate location on the map. Such an implementation may allow a user viewing the map to associate varying bandwidth levels or ranges with the locations of reported events.

Additionally, any information related to the reported event may be accessible via the map by, for example, receiving user-input selecting the event location specified on the map (e.g., by clicking on or hovering a cursor over the location on the map). Further, the system may be configured to receive an indication that the reported event is a private event. In this case, location of the private event (as well as other information related to the event) may not be displayed on the map or accessible via the interface to users not associated with the private event. Note that a map indicating reported event locations may alternatively display other performance measures as discussed above (e.g., latency).

G. Voting Interfaces for Balloon-Network Services

A balloon-network interface could also facilitate group-based control of a balloon network by providing voting features. Provided with a voting interface, users could vote on respective areas where the users would like certain services to be provided and/or where enhanced service is desired (e.g., increased bandwidth and/or reduced latency). A voting interface could be provided for real-time (e.g., current) service and/or future service. Based on the distribution of the votes received via such a web-based voting interface, a fleet planner could determine the relative demand for a service in different areas and incorporate the demand in different areas into fleet-planning decisions for the balloons (e.g., in an effort to move more balloons to an area where a service is in higher demand).

In an example implementation, votes may be received in various ways. In one example, the interface may include a polling feature to allow users to vote on, for example, one of several regions in a geographic area where users would like certain services to be provided. Additionally or alternatively, the polling feature may allow users to vote on, for example, one of several bandwidth levels to be provided in a specific region. Polls may be initiated by users or may be automatically initiated by the balloon network to receive additional information for fleet-planning decisions. Further, such polls may be accessible, for example, to client devices operating in the coverage area relevant to the initiated polls.

In another example, votes may be received via a map interface, such as the bandwidth maps discussed above in association with FIGS. 6A and 6B. For instance, the map interface may allow users to select particular locations or region on the map where users would like certain services to be provided. Additionally, the map interface may display a vote count for one or more regions (e.g., overlaying bandwidth information) on the map indicating, for example, a number of votes for a service in the region over a predetermined period of time (e.g., over the last two hours). Other examples may also be possible.

H. Auction Interfaces for Balloon-Network Services

There may be situations where demand for services at a standard price exceeds the balloon network's resources. In this and/or in other situations, using an auction process to sell a balloon network's services may be desirable. Accordingly, a web interface may facilitate an auction process for bidding on, e.g., bandwidth, and/or other services provided by the balloon network. Note that these may also be implemented for other services provided by the network.

An auction interface could be provided to allow users to bid on service in real-time (e.g., to bid on immediate service) and/or to bid on future service. In particular, auctions may be initiated by a user or may be automatically initiated by the balloon network to receive additional information for fleet-planning decisions and for determining service costs. Accordingly, a fleet planner for the balloon network could adjust a fleet-planning process in an effort to provide the services that are purchased via such an auction interface.

In some implementations, an auction interface may be provided in the form of a group auction. For instance, users in different regions may specify a payment amount for a service (e.g., the average amount among all users in a region) and the balloon network may responsively allocate services to different regions based on, for example, the average payment amount in each region. Such allocation of services may be in the form of increased probability/priority level for regions with a higher average payment amount. Other examples may also be possible.

I. Bandwidth-Sharing Interfaces

There may be situations where a given user allows for a portion of the bandwidth allocated to their device by the balloon network, to be shared with other users. As such, other users may connect to the balloon network via the first user's device. This may help to extend the coverage area where access to the balloon network is possible.

To facilitate such bandwidth sharing, a web interface may include features that allow a user to allocate a portion of their reserved bandwidth for sharing. The interface may allow the user to specify, for example: (a) a time when they wish to make their bandwidth available, (b) an amount of bandwidth being offered (uplink and/or downlink), (c) pricing parameters for the bandwidth, (d) constraints on the content or communications for which the bandwidth can be used, and/or (e) qualifications that must be or preferably are met by the eventual purchaser of the bandwidth. Further, the bandwidth may be offered to the general public, to a public group, to a private group, or to a specific individual.

Further, to facilitate purchases of shared bandwidth, a web interface may include features via which potential buyers can view and/or search for shared bandwidth being offered by other users. Examples of such interfaces include: (a) an auction interface for a location-based auction process in which users to bid on shared bandwidth that currently available or available in the future near their current location or near a location specified by the user, (b) a map interface, where users can see the locations of nearby devices that are sharing bandwidth, and/or (c) a location-based search interface for browsing shared-bandwidth that is available at or near a user's location (e.g., an interface that lists nearby bandwidth shares that are available).

Further, users may create users-accounts to facilitate offering/selling and/or acquiring/purchasing shared bandwidth. Accordingly, the web interface may also allow users to access and/or edit their account information.

J. Balloon-Retrieval Interfaces

There are many scenarios where a balloon's payload, and possibly the entire balloon, may be brought down to the ground, such as a servicing, recovering hardware and/or data from the balloon, and/or an emergency removal from the balloon network. While some control over a balloon's descent may be possible, accuracy in predicting a landing location may be variable. Further, there may be situations where a balloon is brought down unexpectedly, so that deployment of a recovery vehicle and/or personnel may be difficult. Accordingly, balloon-retrieval work may be crowd-sourced via the web interface.

To facilitate crowd-sourced balloon-recovery efforts, a web interface may provide access to information about when and where balloons are expected to be brought down. For example, a user could access a screen where they are shown a list of balloons that are expected to land near the user's current location, and/or where the user can perform a location-based search for balloons that are expected to land near a user-specified location. The list of recoverable balloons may be displayed in a typical search-result layout where users can, e.g., click-through for more information and/or functionality related to recovery of a particular balloon. An example of such an interface is shown in FIG. 9A.

Figure 9A:
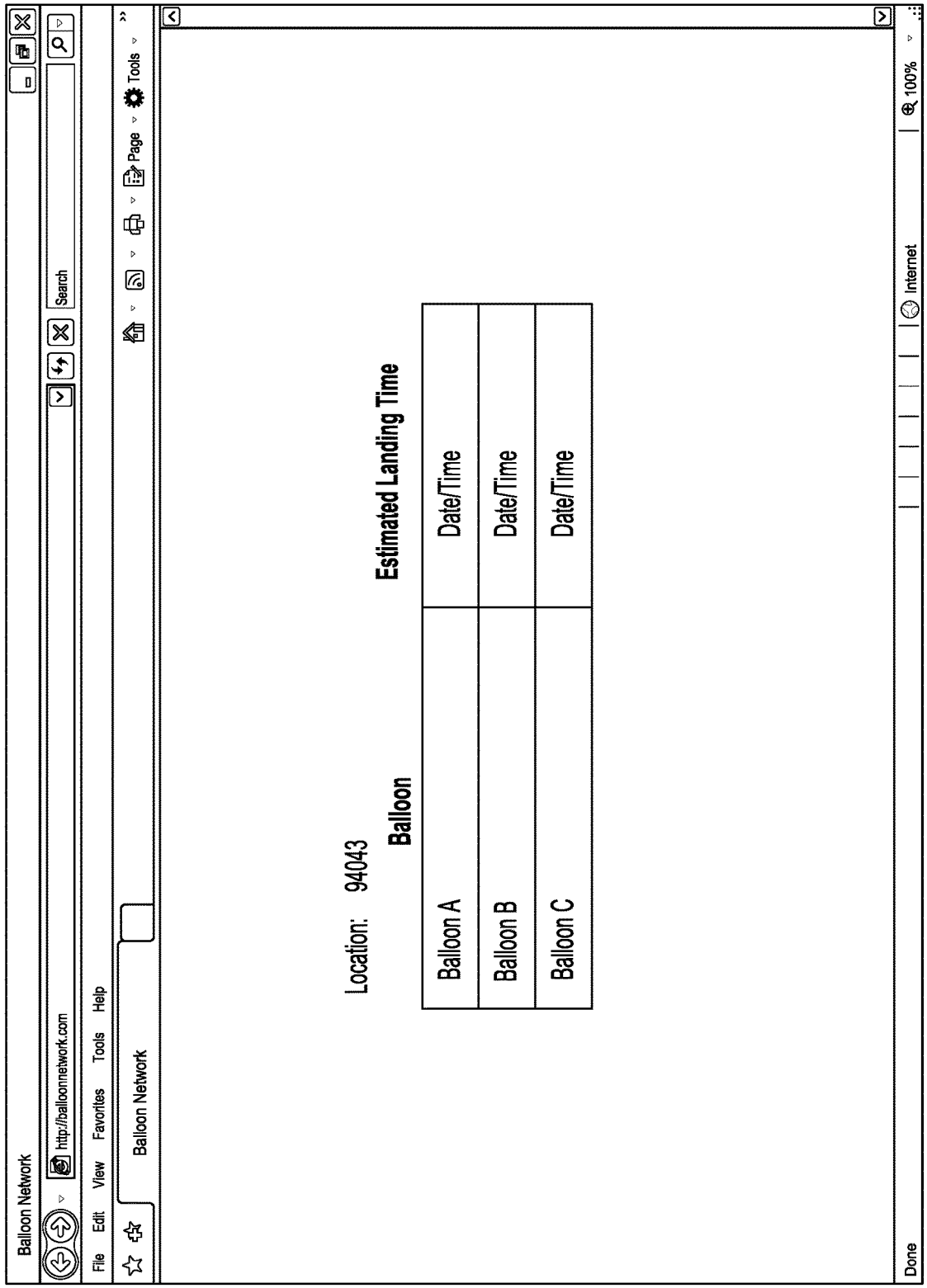
FIG. 9A illustrates an interface for selecting a balloon or balloons to learn information and/or access functionality relevant to recovering the balloon, according to an example embodiment.

Via an interface such as that shown in FIG. 9A, a user could select a balloon or balloons (e.g., by clicking on and/or hovering over listing for the balloon) to learn information and/or access functionality relevant to recovering the balloon. For example, a user could view or access: (a) geographic coordinates of an expected landing location or an actual geographic location where the balloon has landed; (b) a standard error from an estimated landing location (e.g., a one-standard-deviation radius around the expected landing location, which might be displayed on the map when the icon is selected); (c) information related to the particular balloon being brought down; (d) a timing estimate for landing, (e) a feature via which the user can sign up for automatic updates as the balloon descends; (f) reward information for recovery of the balloon; and (g) instructions for returning a balloon and receiving a reward.

Figure 9B:
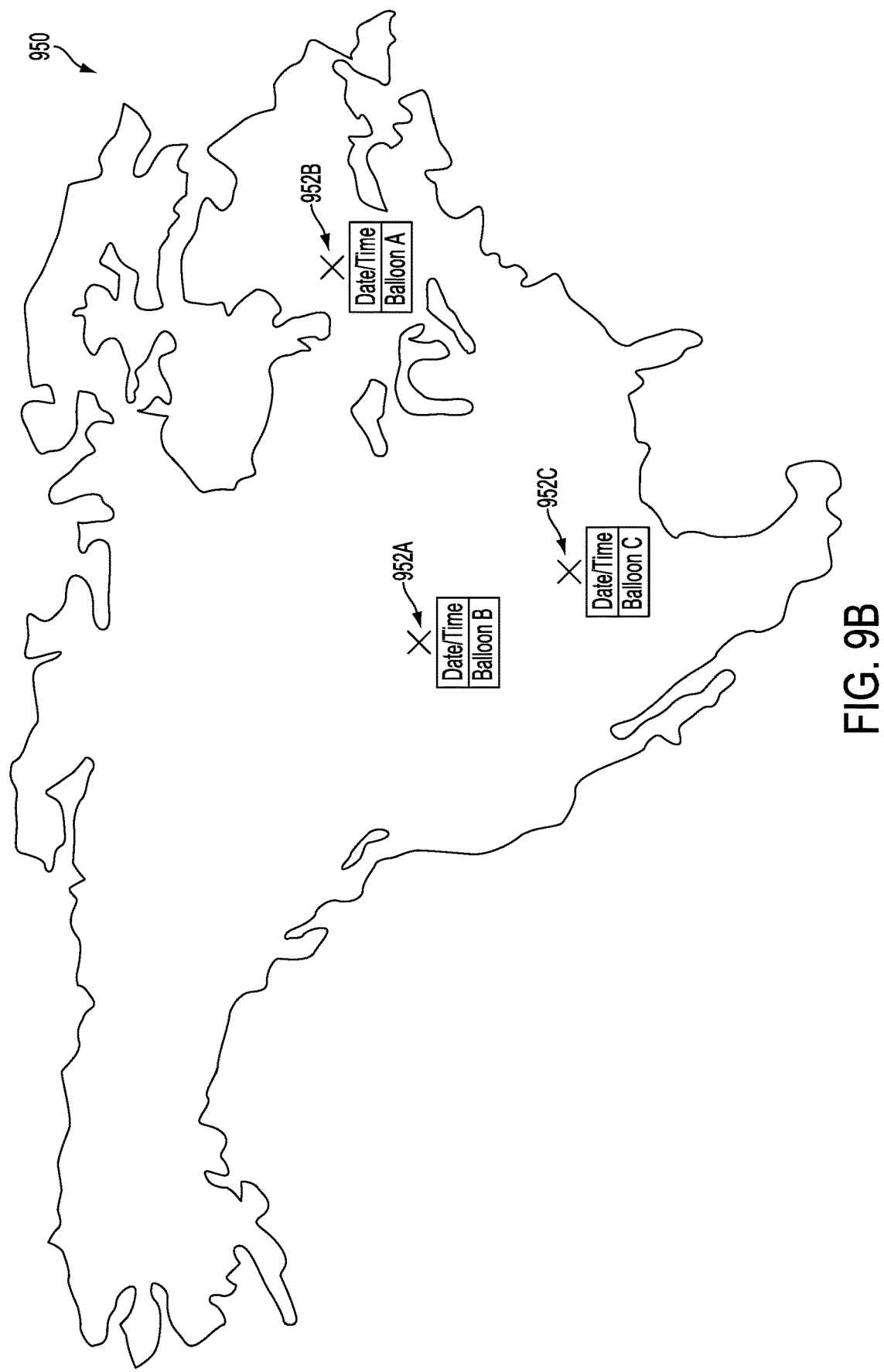
FIG. 9B illustrates an interface for displaying icons at ground locations where balloons are expected to land, according to an example embodiment.

As another example, a map interface may display icons at ground locations where balloons are expected to land. FIG. 9B provides an example of such an interface. Specifically, as shown in FIG. 9B, landing locations 952A to 952C for a number of balloons may be shown on a map interface 950. The map interface 950 may also show an estimated date and/or time that a balloon is expected to land at each expected landing location 952A to 952C, and possibly information about the particular balloon that is expected to land at or near each expected landing location 952A to 952C. Further, a user could then select a given landing location 952A to 952C (e.g., by clicking on and/or hovering over the respect "x" icon) to learn information and/or access functionality relevant to recovering a balloon at the given landing location.

Various types of rewards may be offered, such as monetary payment, goods, credit for services, points, P2P currency, etc. When a reward is offered, an interface screen may also be provided via which a user can redeem a reward, show proof of recovery and return, etc.

For example, a unique reward ID may be physically printed on each balloon (which, theoretically, can only be obtained when a user is in physical possession of the balloon). Accordingly, a web interface may be provided to enter the reward ID from a recovered balloon and request the reward. A server may cross-check the reward ID to make sure that the balloon has been returned to the balloon-network operator (e.g., at a designated drop-off location), and if it has been returned, credit the user's account with the reward or otherwise provide the reward to the user.

In some embodiments, a balloon-recovery interface may simply provide information to facilitate recovery, without pre-assigning recovery to any specific user (e.g., a "free-for-all" recovery system). This arrangement essentially makes balloon-recovery an open competition, which could give rise to "balloon hunters" that try to be the first to locate and arrive at landing sites.

In other embodiments, recovery duties for a particular balloon may be pre-assigned to only one user. Accordingly, a balloon-recovery interface may further allow a user to request that recovery of specific balloons be pre-assigned to them. In such an embodiment, a reward for the return of a balloon may only be collected by the user to which recovery was pre-assigned.

In other embodiments, recovery of a specific balloon may be pre-assigned to a capped number of users (e.g., up to three users may be pre-assigned to recover one balloon). This may be desirable as competition incentivizes quicker recovery of the balloon than if recovery is pre-assigned to only one user, but too much competition (e.g., a free-for-all) may deter users from participating due to a low perceived probability of being the first to reach landing sites.

In some embodiments, the balloon-recovery interface might allow a user to indicate their availability to recover balloons. In particular, the user could provide times when and/or locations where the user is available to recover balloons. The user could indicate their generally availability to collect any balloon that lands in the area during a given time period, or could indicate their availability to recover a specific balloon. In either case, a control system for the balloon network could take user-availability for recovery into account when determining when and where balloons should be brought down.

In some embodiments, an auction interface might allow user's to bid to have balloon recovery work assigned to them. In some implementations, an auction process may assign recovery to the user that offers to recover a balloon at the lowest price. In other implementations, assignment of recovery duties may take other criteria into account, in addition or in the alternative to the amount of the reward. For example, assignment of recovery duties may be based at least in part on a user's recovery history (e.g., success rate, average time between landing and return, etc.). Other factors may also be considered.

In a further aspect, a user could opt to install a stand-alone application, or run a web application, for balloon-recovery notification. Further, the user could give such an application permission to access and use their current location. Such an application may then run in the background and send notifications to the user (e.g., e-mails, text messages, or push notifications) when balloons are scheduled to land within some specified period of time within some specified distance from the user's current location.

K. Interface for Removal and/or Inspection of Balloons

For properly authenticated users, an interface may be provided that allows the user to manually request that a balloon be removed from the balloon network and/or brought down to the ground.

For example, governments may require the ability to bring down balloons in order to inspect the balloons and/or for other reasons. In order to comply such regulations, an example web interface may provide a screen where a government official can log in, and possibly provide further information for purposes of authenticating the official. Once the government official is authenticated, an interface may be provided that allows the government official to identify a balloon to bring down to the ground, and/or to indicate a location where a balloon should be brought down (e.g., a landing location).

As a specific example, a properly-authenticated government user could be provided with a map that shows balloons that are located in a geographic area where the government user has authority (e.g., a country or state). Such an interface may be the same or similar in appearance to the map interface shown in FIGS. 7A to 7C, or could take on a different form. The user could then select a balloon that is shown on the map (e.g., by clicking on a balloon icon) to bring the balloon down for inspection. Other examples are also possible.

L. Interfaces for Sensor Control on Balloons

In a further aspect, an interface may be provided that allows the user to request control of and/or to control sensors and systems on balloons for functions that are unrelated to the general operation of the balloon network. In particular, a service provider could provide services where users could pay for the use of balloons, to the extent it does not interfere with a fleet-planning process for the balloon network, to collect data and conduct experiments of the users' own devise. For example, users could pay for acquisition and/or access to high-bandwidth sensor data from balloons' sensors, which may be analyzed and used for various purposes. Further, to the extent they don't interfere with the general functioning of the balloon network, a web interface may allow users to upload experiments or applications that run on balloons in a balloon network and/or on a control system for a balloon network.

M. Balloon-Naming Interface

In some embodiments, a balloon-network web interface may include features that allow a user to purchase naming rights for a balloon. The naming rights may be purchased on a temporary or permanent basis. Further, there may be interface features that allow a user to follow and/or share information about the balloon or balloons they have named. Other balloon-naming features and functions are also possible.

V. ACCESS CONTROL TO WEB INTERFACES

A server systems that provides or support a balloon-network interface, such as one that provides or supports any of the web interfaces described herein, may implement some form of differential access control. As such, users may be required to log in to access balloon-network interfaces, and the information and/or features that are accessible via such interfaces may vary between different users. For example, there may be certain information and/or features that are only accessible to certain government officials who have been authenticated in some way by the server system. Other examples are also possible.

In some instances, differential access control to information and/or features of a web interface could involve varying the timing with which different users can access different information. For example, some users may only be provided with certain data after a certain amount of time has passed since the balloon network acquired the data. However, other users, who may have special privileges based on some form of authentication, may be provided with earlier access to the data via a web interface. A server system supporting a web interface for a balloon network may also implement other types of differential access control, without departing from the scope of the invention.

VI. FEATURES TO PROTECT PERSONAL INFORMATION AND THE IDENTITIES OF PERSONS

In situations in which the systems and methods discussed may collect personal information about users, or may make use of personal information, the users may be provided with an opportunity to control whether programs or features do or do not collect such user information (e.g., information about a user's social network, social actions or activities, profession, a user's preferences, or a user's current location). Further, the users may be provided with an opportunity to control whether and/or how such user information can be used to, e.g., send content and/or provides services that may be more relevant to the user.

In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Further, to the extent that a client device, such as a tablet, mobile phone, or personal computer, sends location data, user settings and/or preferences, and/or other data that may be considered personal or identifying in nature, to a system operated by a balloon-network service provider, the data may be formatted and/or processed such that the data may be linked to the client device, but not the user of the client device. For example, the data that is sent to a server by a given client device may be identified by an identifying code, such as a cryptographically strong hash code, which may be referred to as a "client ID." Such client IDs may not be associated with any user or user-account, and may simply indicate that data associated with the same client ID was provided by the same client device.

VII. CONCLUSION

Further, the above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

We claim:

1. A method, comprising:
   obtaining, by a computing device, information associated with a plurality of unmanned aerial vehicles configured to operate in the stratosphere, the information including at least one of location data or movement data for the plurality of unmanned aerial vehicles;
   predicting, by the computing device based on the at least one of the location data or the movement data of the information associated with the plurality of unmanned aerial vehicles, bandwidth information associated with one or more services to be provided by at least one of the plurality of unmanned aerial vehicles in a given area at a future point in time;
   generating for display on at least one display device, by the computing device based on the predicted bandwidth information, a bandwidth map for at least a portion of the given area at the future point in time; and
   predicting, by the computing device based on the at least one of the location data or movement data of the information associated with the plurality of unmanned aerial vehicles, one or more performance measures associated with the one or more services to be provided by at least one of the plurality of unmanned aerial vehicles in a given area at a future point in time;
   wherein:
   the one or more performance measures include at least one of latency data, throughput data, jitter data or error data; and
   generating the bandwidth map includes generating specific bandwidth information related to a selected one of the plurality of unmanned aerial vehicles, the specific bandwidth information including at least one of forecasted total bandwidth or forecasted available bandwidth.

2. The method of claim 1, wherein the predicted bandwidth information is predicted, at least in part, based on one or more of historical bandwidth information, bandwidth service requests, event reporting, information received from one or more client devices, or fleet-planning decisions for the plurality of unmanned aerial vehicles.

3. The method of claim 2, wherein the historical bandwidth information includes information for the given area during at least one of (i) different times of a particular day, (ii) different times of a particular month, or (iii) different times of year.

4. The method of claim 1, wherein predicting the bandwidth information is further based on an expected future position of one or more client devices remote from the plurality of unmanned aerial vehicles.

5. The method of claim 4, wherein predicting the bandwidth information includes determining whether a selected client device of the one or more client devices will be present in at least the portion of the given area at the future point in time.

6. The method of claim 1, wherein predicting the bandwidth information includes determining boundaries of one or more regions that fall within different bandwidth ranges.

7. The method of claim 6, further comprising dynamically determining the different bandwidth ranges based on an amount of variation in bandwidth that occurs in the given area.

8. The method of claim 1, wherein generating the bandwidth map includes generating visual indications corresponding to bandwidth levels or ranges expected to be allocated to client devices in the given area at the future point in time.

9. The method of claim 1, wherein generating the bandwidth map includes generating an impact of a service request on the predicted bandwidth information prior to execution of the service request.

10. A method, comprising:
    obtaining, by a computing device, event information associated with a plurality of unmanned aerial vehicles configured to operate in the stratosphere, the event information being received from a plurality of sources;
    aggregating, by the computing device, the event information to determine a location where an event is believed to be occurring or is expected to occur;
    adjusting, by the computing devices based on the aggregated event information, a fleet plan for at least a subset of the plurality of unmanned aerial vehicles in order to increase resource allocation at the location;
    predicting, by the computing device based on the event information associated with the plurality of unmanned aerial vehicles, one or more performance measures associated with one or more services to be provided by at least one of the plurality of unmanned aerial vehicles at the location at a future point in time, wherein the one or more performance measures include at least one of latency data, throughput data, jitter data or error data; and generating, for presentation on at least one display device, a bandwidth map for at least a portion of the location at the future point in time, wherein the generating includes generating specific bandwidth information related to one or more of the plurality of unmanned aerial vehicles, the specific bandwidth information including at least one of forecasted total bandwidth or forecasted available bandwidth.

11. The method of claim 10, wherein an increase in resource allocation includes increasing communication bandwidth available at the location.

12. The method of claim 10, wherein the event is a breaking event that is currently happening.

13. The method of claim 10, wherein the event is a future event that has not yet occurred.

14. A control system comprising:
one or more processors;
a non-transitory computer readable medium; and
program instructions stored on the non-transitory computer readable medium and executable by the one or more processors to:
obtain information associated with a plurality of unmanned aerial vehicles configured to operate in the stratosphere, the information including at least one of location data or movement data for the plurality of unmanned aerial vehicles;
predict, based on the at least one of the location data or the movement data of the information associated with the plurality of unmanned aerial vehicles, bandwidth information associated with one or more services to be provided by at least one of the plurality of unmanned aerial vehicles in a given area at a future point in time;
generate for display on at least one display device, based on the predicted bandwidth information, a bandwidth map for at least a portion of the given area at the future point in time; and
predict, based on the at least one of the location data or movement data of the information associated with the plurality of unmanned aerial vehicles, one or more performance measures associated with the one or more services to be provided by at least one of the plurality of unmanned aerial vehicles in a given area at a future point in time;
wherein:
the one or more performance measures include at least one of latency data, throughput data, jitter data or error data; and
generation of the bandwidth map includes generation of specific bandwidth information related to a selected one of the plurality of unmanned aerial vehicles, the specific bandwidth information including at least one of forecasted total bandwidth or forecasted available bandwidth.

* * * * *